(12) United States Patent
Xiang et al.

(10) Patent No.: US 12,457,162 B2
(45) Date of Patent: Oct. 28, 2025

(54) DISTRIBUTED DATA PLANE VERIFICATION METHOD

(71) Applicant: Xiamen University, Fujian (CN)

(72) Inventors: Qiao Xiang, Fujian (CN); Chenyang Huang, Fujian (CN); Ridi Wen, Fujian (CN); Jiwu Shu, Fujian (CN)

(73) Assignee: Xiamen University, Xiamen (CN)

( * ) Notice: Subject to any disclaimer, the term of this patent is extended or adjusted under 35 U.S.C. 154(b) by 642 days.

(21) Appl. No.: 17/745,606

(22) Filed: May 16, 2022

(65) Prior Publication Data

US 2023/0164058 A1 May 25, 2023

(30) Foreign Application Priority Data

Nov. 22, 2021 (CN) .......................... 202111388877.9

(51) Int. Cl.
*H04L 45/02* (2022.01)

(52) U.S. Cl.
CPC .................................. *H04L 45/02* (2013.01)

(58) Field of Classification Search
CPC ....... H04L 45/02; H04L 45/03; H04L 45/033; H04L 45/036; H04L 45/037; H04L 45/0377
See application file for complete search history.

(56) References Cited

U.S. PATENT DOCUMENTS

| | | | | |
|---|---|---|---|---|
| 9,225,601 B2 * | 12/2015 | Khurshid | ............ | H04L 41/0866 |
| 10,681,118 B2 * | 6/2020 | Zhao | .................. | H04L 67/1065 |
| 11,003,426 B1 * | 5/2021 | Wilson | ................ | G06F 9/45508 |
| 11,188,355 B2 * | 11/2021 | Lee | ...................... | G06F 11/3608 |
| 2007/0036165 A1 * | 2/2007 | Rose | ................... | H04L 12/4691 |
| | | | | 370/420 |
| 2019/0108045 A1 * | 4/2019 | Lee | ..................... | G06F 11/3608 |

OTHER PUBLICATIONS

Chen, Shenshen et al. "Carbide: Highly Reliable Networks Through Real-Time Multiple Control Plane Composition." arXiv (Cornell University) (May 22, 2020): n. pag. Web. (Year: 2020).*

* cited by examiner

*Primary Examiner* — Jasper Kwoh

(57) ABSTRACT

There is provided a distributed data plane verification method. The method includes: receiving a data plane verification requirement, a network topology and device-internet protocol (IP) prefix mapping information by a verification planner; generating a directed acyclic network graph DVNet by the verification planner on the basis of the data plane verification requirement and the network topology; decomposing a counting task by the verification planner, so as to enable all devices in a network to obtain decomposed counting tasks; and receiving the decomposed counting tasks by the devices in the network, and counting by verifiers on the devices, so as to obtain a verification result.

12 Claims, 18 Drawing Sheets

$$
\begin{array}{rcl}
reqs & ::= & req^* \\
req & ::= & (packet\_space, ingress\_set, \\
& & [path\_set, req\_context]^*) \\
path\_set & ::= & path\_set \textbf{ and } path\_set \\
& | & path\_set \textbf{ or } path\_set \\
& | & \textbf{not } path\_set \\
& | & hop^* \\
req\_context & ::= & \textbf{exist } count\_exp \mid \textbf{equal} \\
hop & ::= & .\mid dev \mid !dev \mid dev|dev \\
count\_exp & ::= & == N \mid >= N \mid > N \mid <= N \mid < N
\end{array}
$$

Fig. 2

Requirement: all packets entering the network from S with a destination IP in 10.0.0.0/23 must be delivered to D in a simple path waypointing W.

(dstIP=10.0.0.0/23, [S], S.*W.*D and loop_free, "exist >=1")

Topology:

S
| Match | Action |
|---|---|
| 10.0.0.0/23 | fwd(ALL, {A}) |

A
| Match | Action |
|---|---|
| 10.0.0.0/24 | fwd(ANY, {B, W}) |
| 10.0.1.0/24 | fwd(ALL, {W}) |

B
| Match | Action |
|---|---|
| 10.0.0.0/23 | fwd(ALL, {C}) |

W
| Match | Action |
|---|---|
| 10.0.0.0/23 | fwd(ALL, {C}) |

C
| Match | Action |
|---|---|
| 10.0.0.0/23 | fwd(ALL, {D}) |

Table 1 Data set for experimental evaluation

| Network | #Devices | #Links | #Rules |
|---|---|---|---|
| LONet | 6,016 | 43,008 | $3.2 \times 10^7$ |
| Fattree ($k = 48$) | 2,880 | 55,296 | $3.31 \times 10^6$ |
| Internet2 | 9 | 28 | $1.26 \times 10^5$ |
| Stanford | 16 | 74 | $3.84 \times 10^3$ |

Table 2 Verification time (second) for burst update

| Network | APKeep | DDPV | Ratio |
|---|---|---|---|
| LONet | 111,558.276 | 40.442 | 2,758× |
| Fattree | 3,293.302 | 4.042 | 815× |
| Internet2 | 3.728 | 0.283 | 13× |
| Stanford | 0.403 | 0.082 | 5× |

Fig. 8

Memory/MB

DISTRIBUTED DATA PLANE VERIFICATION METHOD

CROSS-REFERENCE TO RELATED APPLICATION

This application claims priority from the Chinese patent application 202111388877.9 filed Nov. 22, 2021, the content of which is incorporated herein in the entirety by reference.

TECHNICAL FIELD

The present disclosure belongs to the technical field of network security, and particularly relates to a distributed data plane verification method and system.

BACKGROUND

Network errors, such as cyclic forwarding, network black holes and waypoint violation, are resulted from a variety of problems (such as, software errors, hardware errors, protocol misconfiguration and supervision negligence). Being ubiquitous in all types of networks (such as enterprise networks, wide area networks and data center networks), the network errors possibly produce disastrous economic and social consequences. How to effectively find such errors is a basic challenge in the network field. As a main method for finding network errors, network verification can automatically check control planes and data planes of network devices to find errors.

The present disclosure emphasizes on data plane verification, which can be used for finding a wider range of network errors (such as switch operating system errors) by checking actual data planes of network devices. Research on data plane verification has been started long before. Early data plane verification tools placed emphasis on verifying snapshots of complete data planes of networks. Recent research focuses on incremental verification (that is, verification of forwarding rule update). As seen from the research, the most advanced data plane verification tool APKeep only needs to spend tens of microseconds for incremental verification each time of rule update.

Despite significant progress in accelerating data plane verification, most existing tools have centralized architectures, which lack scalability of deployment in large networks. Specifically, in a centralized architecture, a server collects data planes from all network devices and verifies requirements. Such a design requires a management network to provide a reliable connection between the server and the network devices, because it is difficult for the server or the network devices to build such a connection themselves. In addition, the server is also a performance bottleneck and a single failure point of the data plane verification tool. In order to scale up of data plane verification, Libra divides the data plane into disjoint packet spaces, Map-Reduce is used to realize parallel verification, and Azure RCDC divides the data plane by means of devices, so as to verify the availability of all shortest paths with higher-level parallelism in a cluster. However, on account of the limitations mentioned above, Libra is still a centralized design, and Azure RCDC can only verify the special requirements of the availability and fault tolerance of the shortest paths.

SUMMARY

In order to solve at least one of the above technical problems, the present disclosure provides a distributed data plane verification (DDPV) method and system.

One aspect of the present disclosure provides a distributed data plane verification method. The method includes:
receiving a data plane verification requirement, a network topology and device-internet protocol (IP) prefix mapping information by a verification planner;
generating a directed acyclic network graph DVNet by the verification planner on the basis of the data plane verification requirement and the network topology;
decomposing a counting task by the verification planner, so as to enable all devices in a network to obtain decomposed counting tasks; and
receiving the decomposed counting tasks by all the devices in the network, and counting by verifiers on the devices, so as to obtain a verification result of data planes.

According to the distributed data plane verification method of at least one implementation of the present disclosure, the data plane verification requirement includes:
packet spaces representing all packet sets participating in verification;
an ingress set representing a start port set on a verification path;
a path set representing a network device set on a transmission path via which a verification requirement is satisfied; and
a requirement context representing constraints for satisfying the data plane verification requirement by means of more preset rules, and specifically, for satisfying at least one of reachability, loop-freeness, no-redundant-delivery routing or path and trajectory integrity verification.

The packet spaces may be defined by different network architectures and include at least one of packet spaces defined by a transmission control protocol/internet protocol (TCP/IP) five-tuple, a TCP/IP five-layer model, an open system interconnect (OSI) seven-layer model and a programmable switch.

Preferentially, the data plane verification requirement is standardly expressed by means of a declarative language.

Preferentially, the data plane verification requirement may be a composite requirement composed of a plurality of data plane verification requirements.

According to the distributed data plane verification method of at least one implementation of the present disclosure, the step of generating a directed acyclic network graph DVNet on the basis of the data plane verification requirement and the network topology includes:
converting the data plane verification requirement expressed in a regular expression into a finite automaton;
multiplying the finite automaton by the network topology to obtain a product graph G0=(V0, E0), where V0 represents a node set in the product graph G0, and E0 represents an edge set having a directed connection relation in the product graph G0; and
carrying out state minimization on the product graph, so as to remove redundant nodes to obtain the directed acyclic network graph.

Preferentially, mapping relations between the nodes in the DVNet and the devices includes a one-to-one relation and a many-to-one relation. The many-to-one mapping relation represents that to-be-transmitted packets may reach the same destination node via different paths, and under the condition that the different paths include the same device, the same device has different identifiers in the different paths.

According to the distributed data plane verification method of at least one implementation of the present disclosure, the steps of receiving the decomposed counting tasks by all the devices in the network, and executing the counting tasks by verifiers on the devices include:

executing the counting tasks by the verifiers on all the devices on the basis of a distance vector (DV) protocol, which includes:

initializing the verifiers on all the devices;

transmitting update messages to the DVNet nodes having adjacency relations one by one by all the devices along a reverse path of the DVNet;

counting by the devices receiving the update messages on the basis of the update messages; and taking a complete counting result finally received by an ingress device of the devices as the verification result;

The DV protocol refers to a method for regulating message transmission and counting result sharing between the verifiers on the devices and neighbor devices.

According to the distributed data plane verification method of at least one implementation of the present disclosure, initializing the verifiers on all the devices includes:

reading data planes of the devices by all the verifiers, where the data planes construct a local equivalence class table, and the local equivalence class table contains information of the packet space and an action;

enabling all the verifiers to compute the number of copies of packets from a current node to a destination node in the DVNet in different packet spaces and store the number in a counting information base; and enabling all the verifiers to incrementally send computation results to the verifiers of the adjacent devices.

The packet space represents a to-be-processed packet set from a current node to a destination node in the DVNet.

The action is a forwarding action for the packets, and includes ALL type and ANY type. The ALL type and ANY type include at least one of anycast forwarding between a plurality of next hops by the network devices, multicast forwarding between a plurality of next hops by the network devices, and forwarding actions defined in an OpenFlow® standard and a P4® (programming protocol-independent packet processors) standard.

The counting information base includes:

CIBIn(v), which represents a counting information base of a downstream node v of a current node in the DVNet, and is used for storing packet spaces and counting results of the downstream node v;

LocCIB(u), which represents a local counting information base of a current node u in the DVNet, and is used for storing packet spaces, counting results, actions and causalities of the current node u in the DVNet; and CIBOut(u), which represents a counting information base of node u which is about to be sent by the current node u to upstream nodes of the node u in the DVNet, and is used for storing new packet spaces and counting results generated after the current node u in the DVNet receives the update message and to-be-retracted packet spaces.

According to the distributed data plane verification method of at least one implementation of the present disclosure, the update message includes information of an expected link, where an expected link field is a tuple (u, v) which indicates messages, represents that the update messages are transmitted in a direction from a node u in the DVNet to a node v in the DVNet, and is used for computing a result of transmission along the link in the DVNet;

a retraction packet space, where a retraction packet space field represents a to-be-deleted packet space list, and counting results of to-be-deleted packet spaces are updated; and a newly-added counting result, where a newly-added counting result field represents a lately-counted packet space list.

Preferentially, the update message may further include an update message invariant. The update message invariant means that for each update message, a union set of the retraction packet spaces is equal to a union set of the packet spaces in the newly-added counting result, and the update message invariant ensures that each node in the DVNet always receives a latest complete counting result from a downstream neighbor node thereof.

According to the distributed data plane verification method of at least one implementation of the present disclosure, counting by the device receiving the update message on the basis of the update message, includes updating CIBIn(v); updating LocCIB(u) and updating CIBOut(u).

The step of updating CIBIn(v) includes:

deleting all entries belonging to the to-be-retracted packet space in the CIBIn(v) and inserting all the newly-added counting results into the CIBIn(v) by the u.dev, so as to update the CIBIn (v).

The step of updating LocCIB(u) includes:

finding all to-be-updated entries by the u.dev, where a method for determining to-be-updated entries includes:

under the condition that a causality field of an entry in the LocCIB(u) contains a packet space in v belonging to the retraction packet space of the message, updating the entry; and updating counting results of all the to-be-updated entries one by one, which includes:

computing, by the u.dev, an intersection set S of a packet space of each pair of to-be-updated entry r and entry r0 obtained from the newly received counting result;

creating a new entry $r^{new}$ for the packet space S in the LocCIB(u) under the condition that the intersection set S is not empty, where a method for computing a counting result of the $r^{new}$ includes:

carrying out an inverse operation of $\otimes$ or $\oplus$ in causality of $r^{new}$.count and the counting result before the node v in the DVNet, so as to eliminate an effect of carrying out $\otimes$ or $\oplus$ between a result of a last step and r0.count, so as to obtain a latest counting result, where $\otimes$ represents a counting vector first operation and $\oplus$ represents a counting vector second operation;

carrying out $\otimes$ or $\oplus$ between the result of the last step and r0.count, so as to obtain the latest counting result, where a forwarding action of a $r^{new}$ is the same as that of the to-be-update entry r, and causality of the $r^{new}$ inherits causality of r, and a tuple (v, r0.predicate, r0.count) replaces a previous record of v; and computing and inserting all new entries into the LocCIB (u) to finish update, and deleting all the to-be-updated entries from the LocCIB(u).

The step of updating CIBOut(u) includes:

putting the packet spaces of all the entries deleted from the LocCIB(u) in the retraction packet space; and merging all the inserted entries in the CIBOut(u) according to whether the counting results are the same, carrying out merging under the condition that the counting results are the same, and putting the merged entries into the newly-added counting result, so as to replace the entries where the merged packet spaces are located.

Meanings of all expressions are as follows:
.predicate represents a packet space of to-be-forwarded packets at a certain port of the device.
.count represents the counting result.
u represents a current node identifier in the DVNet.
v represents an upstream node identifier of the current node in the DVNet.
.dev represents a device identifier of the current node in DVNet.
CIBIn(v) represents a counting information base of a downstream node v of a current node in the DVNet, and is used for storing packet spaces and counting results of the downstream node v.
LocCIB(u) represents a counting information base of a local node of a current node u in the DVNet, and is used for storing packet spaces, counting results, actions and causalities of the current node u in the DVNet.
CIBOut(u) represents a counting information base of node u which is about to be sent by the current node u to upstream nodes of the node u in the DVNet, and is used for storing new packet spaces and counting results generated after the current node u in the DVNet receives the update message and to-be-retracted packet spaces.

The distributed data plane verification method of at least one implementation of the present disclosure, further includes: under the condition that there are to-be-updated data planes of devices, updating the data planes by processing the update messages on the basis of the DV protocol, which includes:
  newly inserting entries in LocCIB(u), where the counting results of the entries are computed by means of a first counting vector operation or a second counting vector operation and by reading related entries in different CIBIn (v), and the related entries represent entries existing in causalities of the newly inserted entries in the CIBIn(v); and
  taking only the newly-added counting entries and the updated lately-counted packet spaces as the retraction packet spaces in CIBOut(u);
Data plane update includes insertion/deletion of rules or activation/deactivation of physical ports.

The distributed data plane verification method of at least one implementation of the present disclosure further includes:
  checking, after a current device processes the update message and before a new update message is sent, whether there are still unprocessed update messages of update links;
  continuing, under the condition that unprocessed update messages of update links are detected, to process the update messages by the current device until all the update messages are processed;
  sending latest CIBOut(u) of a current node in a last update message period; and
  giving a requirement with a counting result value in a context on the basis of counting monotonicity of the DVNet, where when the current node u finishes computing $c^u$,
  under the condition that the counting result value is greater than or equal to N or the counting result value is less than or equal to N,
    the current node u only needs to send a minimum element or a maximum element in $c^u$ to an upstream neighbor node in the DVNet; and
  under the condition that the counting result value is equal to N,
    in the case that $c^u$ has only one element, the only element is sent to the upstream node of the current node u; and
    in the case that $c^u$ has two or more elements, the two minimum elements in the $c^u$ are sent to the upstream node of the current node u.

For a requirement having context equivalence, minimum counting information of the current node u is an empty set, such that distributed verification becomes local verification. Preferentially, the node u even does not need to compute $c^u$, and the node u checks whether u.dev forwards any packet specified in the requirement to all devices of downstream neighbors of the u in the DVNet, if not, it is indicated that a current network state violates the requirement to be verified, and u.dev generates exception prompt information.

Meanings of all expressions are as follows:
CIBOut(u) represents a counting information base which is about to be sent by the current node u to the upstream nodes of node u in the DVNet, and is used for storing new packet spaces and counting results generated after the current node u in the DVNet receives the update message and to-be-retracted packet spaces.
$c^u$ represents a counting vector result of the current node u;
The counting monotonicity of the DVNet has the following meaning: assuming that two vectors c1 and c2 have only nonnegative elements, under the condition that any element x∈c1 and y∈c2 and a corresponding element z=y+z∈c1⊗2, it is certain that z≥y and z≥z, and under the condition that any element x∈c1 and a corresponding element z=x∈c1 ⊕c2, it is certain that z≥x.
u.dev represents a device identifier of the current node in the DVNet.

Another aspect of the present disclosure provides a distributed data plane verification system. The system includes:
  a verification planner receiving a data plane verification requirement, a network topology and a device-IP prefix mapping information, generating a directed acyclic network graph DVNet on the basis of the data plane verification requirement and the network topology, and decomposing a counting task, so as to all devices in a network to obtain decomposed counting tasks; and
  a plurality of verifiers distributed on all the devices in the network, configured to receive the decomposed counting tasks and execute the counting tasks, and obtaining a data plane verification result by means of a counting result, where the counting result is a complete counting result finally received by an ingress device of the devices.

BRIEF DESCRIPTION OF DRAWINGS

The accompanying drawings, which are included to provide a further understanding of the present disclosure and are incorporated in and constitute a part of the description, illustrate exemplary implementations of the present disclosure and, together with the description thereof, serve to explain the principles of the present disclosure.

FIG. 2 is a schematic diagram of requirement specification language abstract syntax according to an implementation of the present disclosure.

FIG. 8 is a schematic comparison diagram of a green start experiment effect of a data plane verification method according to an implementation of the present disclosure.

FIG. 10 (b) is a schematic comparison diagram of bandwidth overhead of a distributed data verification method according to an implementation of the present disclosure.

DETAILED DESCRIPTION OF THE EMBODIMENTS

The present disclosure will be further described in detail below with reference to the accompanying drawings and the implementations. It should be understood that the implementations described herein are merely used to explain the relevant content, rather than limit the present disclosure. In addition, it should be noted that, for the convenience of description, merely the part related to the present disclosure is shown in the accompanying drawings.

Figure 1:
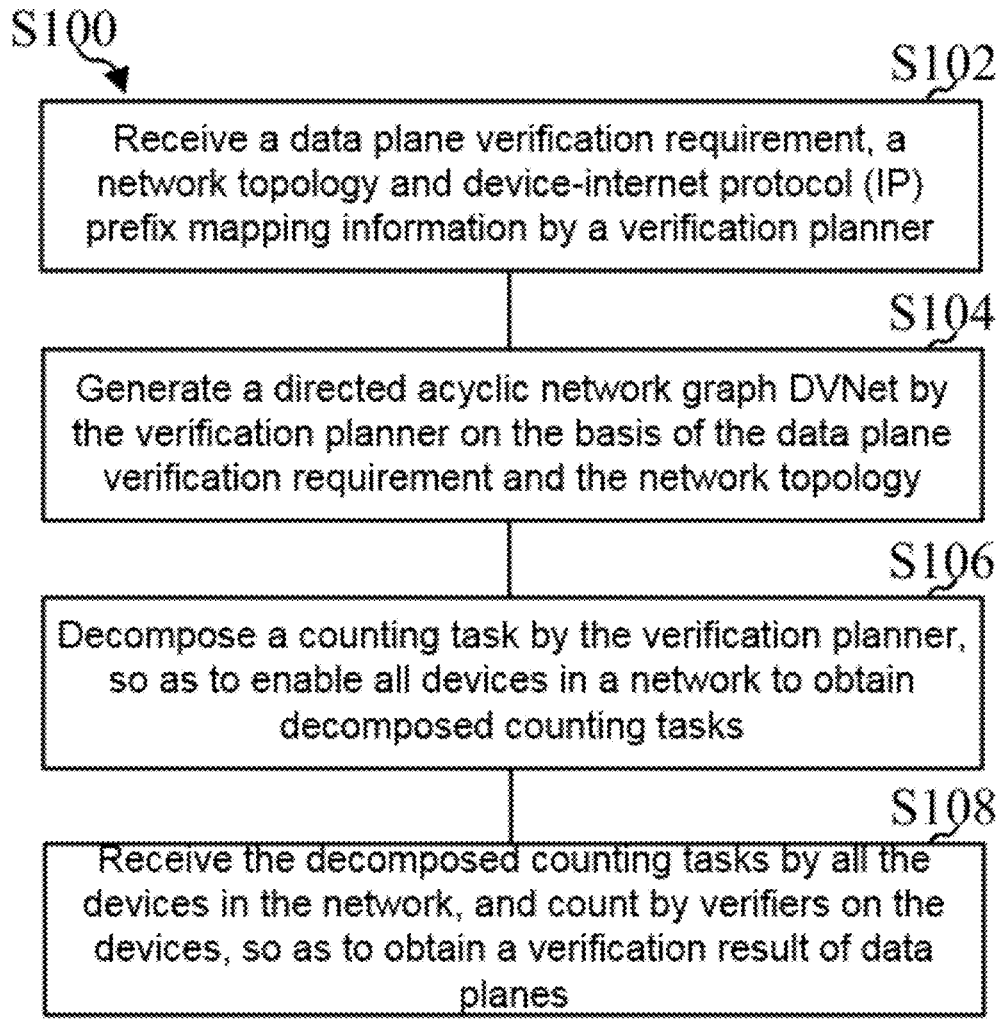
FIG. 1 is a flow schematic diagram of a distributed data plane verification method according to an implementation of the present disclosure.

FIG. 1 is a flow schematic diagram of a distributed data plane verification method according to an implementation of the present disclosure.

As shown in FIG. 1, the distributed data plane verification (DDPV) method S100 includes:
S102: receive a data plane verification requirement, a network topology and device-internet protocol (IP) prefix mapping information by a verification planner;
S104: generate a directed acyclic network graph DVNet by the verification planner on the basis of the data plane verification requirement and the network topology;
S106: decompose a counting task by the verification planner, so as to enable all devices in a network to obtain decomposed counting tasks; and
S108: receive the decomposed counting tasks by all the devices in the network, and count by verifiers on the devices, so as to obtain a verification result of data planes.

The data plane verification requirement includes:
packet spaces representing all packet sets participating in verification;
an ingress set representing a start port set on a verification path;
a path set representing a network device set on a transmission path via which a verification requirement is satisfied; and
a requirement context representing constraints for satisfying the data plane verification requirement by means of more preset rules, and specifically, for satisfying at least one of reachability, loop-freeness, no-redundant-delivery routing or path and trajectory integrity verification.

Preferentially, the data plane verification requirement is standardly expressed by means of a declarative language.

Preferentially, the data plane verification requirement may be a composite requirement composed of a plurality of data plane verification requirements.

The packet spaces (the packet spaces involved in the distributed data plane verification method of the present disclosure) include the packet spaces defined by a transmission control protocol/internet protocol (TCP/IP) five-tuple, the packet spaces involved in data link layers, network layers and transport layers in a TCP/IP five-layer model and an OSI (open system interconnect) seven-layer model, and even the packet spaces defined by a programmable switch in addition to the above traditional packet spaces. The TCP/IP five-tuple refers to a source IP address, a source port, a destination IP address, a destination port and a transport layer protocol. The transmission control protocol (TCP) is a connection-oriented, reliable, byte-stream based transport layer communication protocol.

The step of generating a directed acyclic network graph DVNet by the verification planner on the basis of the data plane verification requirement and the network topology includes:
convert the data plane verification requirement expressed in a regular expression into a finite automaton;
multiply the finite automaton by the network topology to obtain a product graph G0=(V0, E0), where V0 represents a node set in the product graph G0, and E0 represents an edge set having a directed connection relation in the product graph G0; and
carry out state minimization on the product graph, so as to remove redundant nodes to obtain the directed acyclic network graph.

Preferentially, mapping relations between the nodes in the DVNet and the devices include a one-to-one relation and a many-to-one relation. The many-to-one mapping relation represents that to-be-transmitted packets may reach the same destination node via different paths. Under the condition that the different paths include the same device, the same device has different identifiers in the different paths.

The steps of receiving the decomposed counting tasks by all the devices in the network, and executing the counting tasks by verifiers on the devices include:
execute the counting tasks by the verifiers on all the devices on the basis of a distance vector (DV) protocol, which includes:
initialize the verifiers on all the devices;
transmit update messages to the DVNet nodes having adjacency relations one by one by all the devices along a reverse path of the DVNet;
count by the devices receiving the update messages on the basis of the update messages; and
take a complete counting result finally received by an ingress device of the devices as the verification result.

The DV protocol refers to a method for regulating message transmission and counting result sharing between the verifiers on the devices and neighbor devices.

The step of initializing the verifiers on all the devices includes:
  read data planes of the devices by all the verifiers, where the data planes construct a local equivalence class table, and the local equivalence class table contains information of the packet space and an action;
  compute the number of copies of packets from a current node to a destination node in the DVNet in different packet spaces by all the verifiers and store the number in a counting information base; and
  incrementally send computation results to the verifiers of the adjacent devices by all the verifiers.

The packet space represents a to-be-processed packet set from a current node to a destination node in the DVNet (for example: assuming that a current device is A, a data plane forwarding information base (FIB) thereof has several rules, and these rules will specify which packets are forwarded from which port of the device A. If the forwarding ports are the same, that is, the forwarding actions of these packets are the same, then these packets are classified into an equivalence class. All the packets which constitute the equivalence class have one property that packets, which are all forwarded out of a certain port, constitute a set, which may be understood as a space, and the is the packet space here. "Forwarded from a certain port" is the forwarding action of the local equivalence class.)

The action is a forwarding action for the packets, that is, ALL type and ANY type. The ALL type and ANY type include at least one of anycast forwarding between a plurality of next hops by the network devices, multicast forwarding between a plurality of next hops by the network devices, and forwarding actions defined in an OpenFlow® standard and a P4® (programming protocol-independent packet processors) standard. The specific meaning of the ALL type is that for a packet p, p is forwarded to a plurality of next hops simultaneously on a device having a plurality of next hops. P is forwarded to only one next hop on a device having only one next hop. The specific meaning of the ANY type is that for a packet p, p is forwarded to one of a plurality of next hops of a device having a plurality of next hops, and in the case, p produces a plurality of coexistence path sets, that is, a plurality of parallel universes. P is forwarded to only one next hop on a device having only one next hop. In the case, p only produces one coexistence path set, that is, one parallel universe.

The counting information base includes:
  $CIBIn(v)$, which represents a counting information base of a downstream node v of a current node in the DVNet, and is used for storing packet spaces and counting results of the downstream node v;
  $LocCIB(u)$, which represents a local counting information base of a current node u in the DVNet, and is used for storing packet spaces, counting results, actions and causalities of the current node u in the DVNet; and
  $CIBOut(u)$, which represents a counting information base of node u which is about to be sent by the current node u to upstream nodes of the node u in the DVNet, and is used for storing new packet spaces and counting results generated after the current node u in the DVNet receives the update message and to-be-retracted packet spaces.

The number of copies of packets refers to that in a network, when the packets are transmitted to a certain device, under the condition of no errors after check, the device will copy the packets and forward the packets to one or more devices, and the copied packets may eventually reach the destination node, and the number of copies of the packet number here is the number of copies of packets received by the node finally.

The update message includes the following information:
  an expected link, where an expected link field is a tuple (u, v) which indicates messages, represents that the update messages are transmitted in a direction from a node u in the DVNet to a node v in the DVNet, and is used for computing a result of transmission along the link in the DVNet;
  a retraction packet space, where a retraction packet space field represents a to-be-deleted packet space list, and counting results of to-be-deleted packet spaces are updated; and
  a newly-added counting result, where a newly-added counting result field represents a lately-counted packet space list.

Preferentially, the update message may further include an update message invariant. The update message invariant means that for each update message, a union set of the retraction packet spaces is equal to a union set of the packet spaces in the newly-added counting result, and the update message invariant ensures that each node in the DVNet always receives a latest complete counting result from a downstream neighbor node thereof.

The step of counting by the device receiving the update message on the basis of the update message includes updating $CIBIn(v)$; updating $LocCIB(u)$ and updating $CIBOut(u)$.

The step of updating $CIBIn(v)$ includes:
  delete all entries belonging to the to-be-retracted packet space in the $CIBIn(v)$ and inserting all the newly-added counting results into the $CIBIn(v)$ by the u.dev, so as to update the $CIBIn(v)$.

The step of updating $LocCIB(u)$ includes:
  find all to-be-updated entries by the u.dev, where a method for determining to-be-updated entries includes:
    under the condition that a causality field of an entry in the $LocCIB(u)$ contains a packet space in v belonging to the retraction packet space of the message, update the entry; and
  update counting results of all the to-be-updated entries one by one, which includes:
  compute, by the u.dev, an intersection set S of a packet space of each pair of to-be-updated entry r and entry r0 obtained from the newly received counting result;
  create a new entry $r^{new}$ for the packet space S in the $LocCIB(u)$ under the condition that the intersection set S is not empty, where a method for computing a counting result of the $r^{new}$ includes:
  carry out an inverse operation of $\otimes$ or $\oplus$ in causality of $r^{new}$.count and the counting result before the node v in the DVNet, so as to eliminate an effect of carrying out $\otimes$ or $\oplus$ between a result of a last step and r0.count, so as to obtain a latest counting result, where $\otimes$ represents a counting vector first operation and $\oplus$ represents a counting vector second operation;
  carry out $\otimes$ or $\oplus$ between the result of the last step and r0.count, so as to obtain the latest counting result, where
  a forwarding action of a $r^{new}$ is the same as that of the to-be-update entry r, and
  causality of the $r^{new}$ inherits causality of r, and a tuple (v, r0.predicate, r0.count) replaces a previous record of v; and
  compute and insert all new entries into the $LocCIB(u)$ to finish update, and delete all the to-be-updated entries from the $LocCIB(u)$.

The step of updating CIBOut(u) includes:
put the packet spaces of all the entries deleted from the LocCIB(u) in the retraction packet space; and
merge all the inserted entries in the CIBOut(u) according to whether the counting values are the same, carry out merging under the condition that the counting values are the same, and put the merged entries into the newly-added counting result, so as to replace the entries where the merged packet spaces are located.

Meanings of all expressions are as follows:
.predicate represents a packet space of to-be-forwarded packets at a certain port of the device.
.count represents the counting value.
u represents a current node identifier in the DVNet.
v represents an upstream node identifier of the current node in the DVNet.
.dev represents a device identifier of the current node in DVNet.
CIBIn(v) represents a counting information base of a downstream node v of a current node in the DVNet, and is used for storing packet spaces and counting results of the downstream node v.
LocCIB(u) represents a counting information base of a local node of a current node u in the DVNet, and is used for storing packet spaces, counting results, actions and causalities of the current node u in the DVNet.
CIBOut(u) represents a counting information base of node u which is about to be sent by the current node u to upstream nodes of the node u in the DVNet, and is used for storing new packet spaces and counting results generated after the current node u in the DVNet receives the update message and to-be-retracted packet spaces.

The computation processes of a counting vector first operation and a counting vector second operation are as follows:

Taking an example of the counting vector first operation: $c_i \otimes c_j = (a+b | a \in c_i, b \in c_j)$, where ci and cj are both counting vectors, duplication is removed after the operation is completed, and a final result is a vector with no repeated element values, such as:
[1, 2]⊗[3, 4]=[1+3, 1+4, 2+3, 2+4]=[4, 5, 5, 6](which is a result of the operation)=[4, 5, 6], which is a final counting result of a certain predicate (packet space) by a node device.

Taking an example of the counting vector second operation: for example: [1, 2, 3]⊕[3, 4, 5]=[1, 2, 3, 3, 4, 5], and duplication is removed to obtain [1, 2, 3, 4, 5], which is taken as the counting result of a certain predicate (packet space). It should be noted that, when a next hop existing in an action set of a certain forwarding rule of a certain device does not have a corresponding node existing in the DVNet, the node corresponding to the device sets a counting result of the node corresponding to the next hop as 0 to participate in the second operation.

The distributed data plane verification method further includes: under the condition that there are to-be-updated data planes of devices, update the data planes by processing the update messages on the basis of the DV protocol, which includes:
newly insert entries in LocCIB(u), where the counting results of the entries are computed by means of a first counting vector operation or a second counting vector operation and by reading related entries in different CIBIn (v), and the related entries represent entries existing in causalities of the newly inserted entries in the CIBIn(v); and
take only the newly-added counting entries and the updated lately-counted packet spaces as the retraction packet spaces in CIBOut(u).

Data plane update includes insertion/deletion of rules or activation/deactivation of physical ports.

The distributed data plane verification method further includes:
check, after a current device processes the update message and before a new update message is sent, whether there are still unprocessed update messages of update links;
continue, under the condition that unprocessed update messages of update links are detected, to process the update messages by the current device until all the update messages are processed;
send latest CIBOut(u) of a current node in a last update message period; and
give a requirement with a counting result value in a context on the basis of counting monotonicity of the DVNet, where when the current node u finishes computing cu,
under the condition that the counting result value is greater than or equal to N or the counting result value is less than or equal to N,
the current node u only needs to send a minimum element or a maximum element in $c^u$ to an upstream neighbor node in the DVNet; and
under the condition that the counting result value is equal to N,
in the case that $c^u$ has only one element, the only element is sent to the upstream node of the current node u; and
in the case that $c^u$ has two or more elements, the two minimum elements in the $c^u$ are sent to the upstream node of the current node u.

For a requirement having context equivalence, minimum counting information of the current node u is an empty set, such that distributed verification becomes local verification. Preferentially, the node u even does not need to compute cu, and the node u checks whether u.dev forwards any packet specified in the requirement to all devices of downstream neighbors of the u in the DVNet, if not, it is indicated that a current network state violates the requirement to be verified, and u.dev generates exception prompt information.

Meanings of all expressions are as follows:
CIBOut(u) represents a counting information base which is about to be sent by the current node u to the upstream nodes of the node u in the DVNet, and is used for storing new packet spaces and counting results generated after the current node u in the DVNet receives the update message and to-be-retracted packet spaces.
$c^u$ represents a counting vector result of the current node u;
The counting monotonicity of the DVNet has the following meaning: assuming that two vectors c1 and c2 have only nonnegative elements, under the condition that any element x∈c1 and y∈c2 and a corresponding element z=y+z∈c1 c2, it is certain that z≥y and z≥z, and under the condition that any element x∈c1 and a corresponding element z=x∈c1 c2, it is certain that z≥x.
u.dev represents a device identifier of the current node in the DVNet.

FIG. 2 is a schematic diagram of requirement specification language abstract syntax according to an implementation of the present disclosure.

As shown in FIG. 2, the requirement specification language abstract syntax is a declarative language. Each requirement req is represented by a tuple (a packet space packet_space, an ingress set ingress_set, a path set path_set and a requirement context req_context). When each packet in the packet_space enters the network from any device in the ingress set ingress_set, a relation between a path thereof and a pattern specified in the path set path_set certainly satisfy a context specified in the requirement context req_context. The path set path_set is specified in a regular expression. Specifically, for example, the requirement (source address src IP=10.0.1.0/24 and a destination address dst IP=10.0.2.0/24, [S], S.*W.*D, "exist>=1") specifies that for any packet p having a source IP address in 10.0.1.0/24 and a destination IP address in 10.0.2.0/24, in all universes of p, there is at least one path of a device D having an external port passing through a path point W and capable of reaching a destination IP address in 10.0.2.0/24.

The DDPV (distributed data plane verification) provides an operator with a mapping table (device, IP address prefix), where each destination IP address indicating the IP address prefix may reach the device via an external port of the device. If there is a requirement that the destination IP prefix between the packet_space and the terminal device in path_set does not match, a system returns an error message, such that the operator may conveniently update the requirement.

For requirement context req_context, two kinds of requirement contexts are introduced in the language, which are exist count_exp (which indicates that there is a counting result value, exist represents existence, count_exp represents the counting result value, and exist count_exp in other parts of the present disclosure has the same meaning) and equal (which indicates equivalence, equal in other parts of the present disclosure has the same meaning), so as to support specifying a wide range of existence requirements and equivalence requirements.

exist count_exp (which indicates the presence of a counting result value) may be used for supporting common requirements of reachability and loop-freeness, and may be further used for supporting advanced requirements such as "no-redundant-delivery routing" and "elasticity".

equal is useful to verify integrity of a packet path. As a specific example, (srcIP=10.0.1.0/24 and dstIP=10.0.2.0/24, [S], SD|S.D|S . . . D, "equal"), the number of hops of all paths of p to D in any full set certainly does not exceed four, and all paths from S to D in less than 4 hops are certainly all be paths of p.

Composite requirement The language further support expressing multicast and anycast requirements by means of a logical combination of a plurality of (path_set, req_context) tuples. For example, assuming a grouped space H from 10.0.0.1 to 224.0.0.1, there are two destination devices D and E. The following tuples (H,[S],[(S.*D,"exist>=1") and (S,*E,"exist>=1")]), The multicast requirement for the packet space is specified.

We further focus on a plurality of regular expressions to describe how a given requirement and verification planner determines the verification tasks on each device. We focus on a logical combination requirement of a plurality of (path_set, exist count_exp) tuples, because regular expressions having equal contexts may be locally verified. Specifically, the situation of composite requirements of regular expressions having different sources may be processed by adding virtual source devices connected to all sources. Therefore, we classify the composite requirements into two categories according to destination addresses of the regular expressions. One kind of regular expressions have different destination addresses. The other kind of regular expressions have the same destination address.

Figure 3:
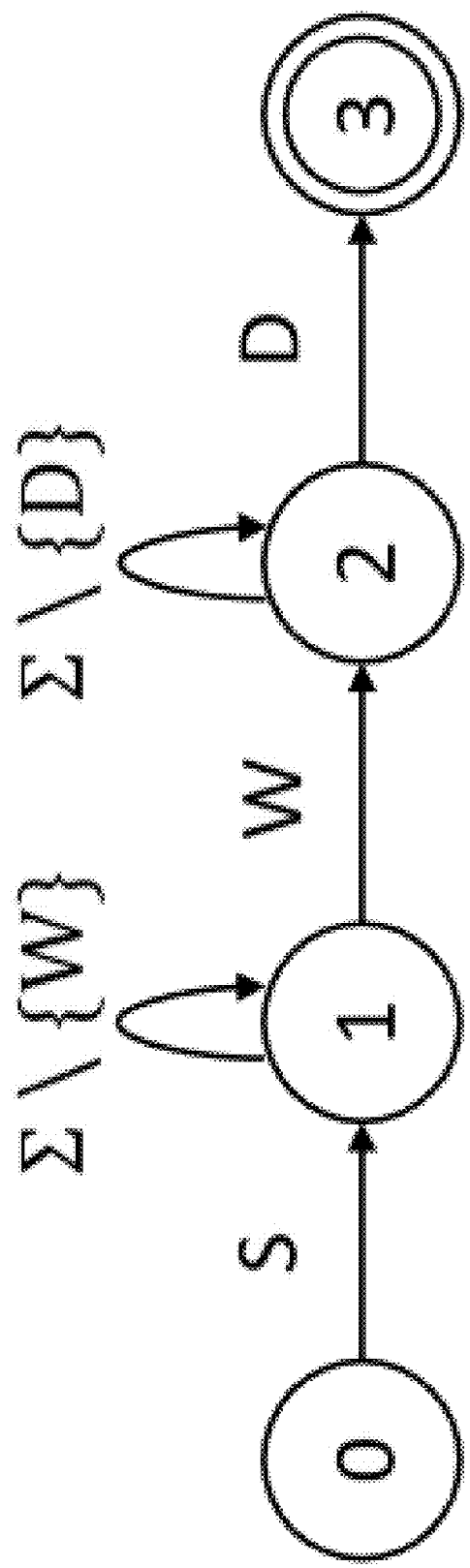
FIG. 3 is a schematic diagram of a method for converting a regular expression into a finite automaton according to an implementation of the present disclosure.

FIG. 3 is a schematic diagram of a method for converting a regular expression into a finite automaton according to an implementation of the present disclosure.

As shown in FIG. 3, the method for converting a regular expression into a finite automaton specifically, includes: give a regular expression path_set, and convert the regular expression into a finite automaton ($\Sigma$, Q, F, q0, $\delta$) at first, where $\Sigma$ is an alphabet, each symbol is an identifier of a network device in a network, Q is a state set in the automaton, q0 is an initial state, F is an accept state set, and $\delta$: $Q \times \Sigma \rightarrow Q$ is a state transition function. For example, the regular expression of a path set of a network having devices S, W, A, B, C and D is S.*W.*D, FIG. 3 is a regular expression S.*W.*D, that is, a finite automaton of the alphabet $\Sigma$={S, W, A, B, C, D}.

Figure 4:
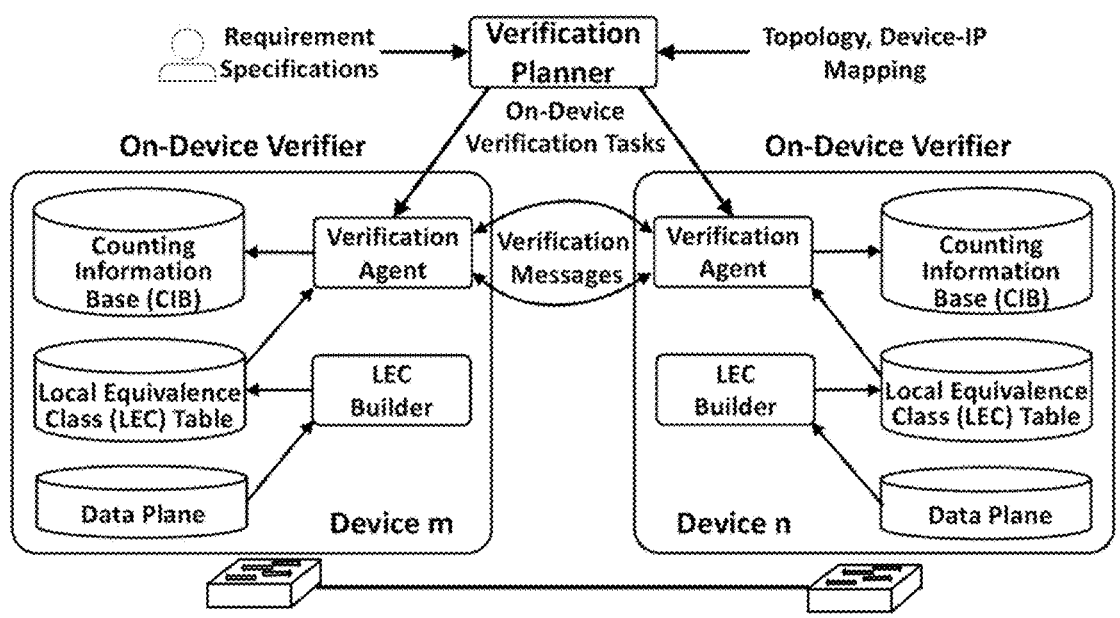
FIG. 4 is a schematic structural diagram of a distributed data plane verification system according to an implementation of the present disclosure.

FIG. 4 is a schematic structural diagram of a distributed data plane verification system according to an implementation of the present disclosure.

As shown in FIG. 4, the distributed data plane verification system includes:

a verification planner receiving a data plane verification requirement, a network topology and a device-IP prefix mapping information, generating a directed acyclic network graph DVNet on the basis of the data plane verification requirement and the network topology, and decomposing a counting task, so as to all devices in a network to obtain decomposed counting tasks; and a plurality of verifiers distributed on all the devices in the network, and configured to receive the decomposed counting tasks and execute the counting tasks.

The verification planner is logically centralized. The verification planner collects the verification requirement using DDPV specification language, a network topology and (device, IP prefix) mapping table information, and determines verification task of each network device, so as to complete distributed verification of requirements. Therefore, the verification planner first multiplies the requirement by the path set path_set of the regular expression in the network topology according to the automaton theory, so as to finally obtain a directed acyclic graph DVNet. DVNet compactly represents all allowed paths in the network satisfying the requirement.

The verification planner may convert a data plane verification problem into a counting question on the DVNet, that is, under the condition that a packet p entering the DVNet is given, whether there are enough copies of p in all of universes of p to be delivered to the destination node of the DVNet.

However, the data planes of all devices need to be collected to count directly on the DVNet, and this method is still centralized and non-extensible. Therefore, the verification planner further decomposes the counting problem into counting tasks on smaller devices located on the DVNet node, that is, counting packets which may reach the destination node in the DVNet from the node. These tasks and device-to-device communication instructions are sent to the corresponding devices in the network topology and are distributively executed to compute the final verification result.

The verifiers receive the counting tasks from the verification planner, execute the counting tasks and then send the counting result to the corresponding neighbor device in update message (verification message) according to a predefined communication instruction from the verification planner. Therefore, we design a distributed verification DV protocol, which specifies how verifiers compute and update tasks thereof on the devices, and how verifiers transmit the results to neighbor devices efficiently and correctly. In short, in order to carry out the verification tasks on the devices, the verifiers first read the data planes of the devices and construct a local equivalence class (LEC) table. Then, the verifiers take the LEC table and the counting results received from downstream nodes as input and compute the number of copies of packets reaching the destination node from the corresponding node in the DVNet of different packet spaces. These results are stored in the counting information base (CIB) and are incrementally sent to the verifiers on the other neighbor devices according to device communication instructions specified by the verification planner and the DV protocol.

Figure 5A:
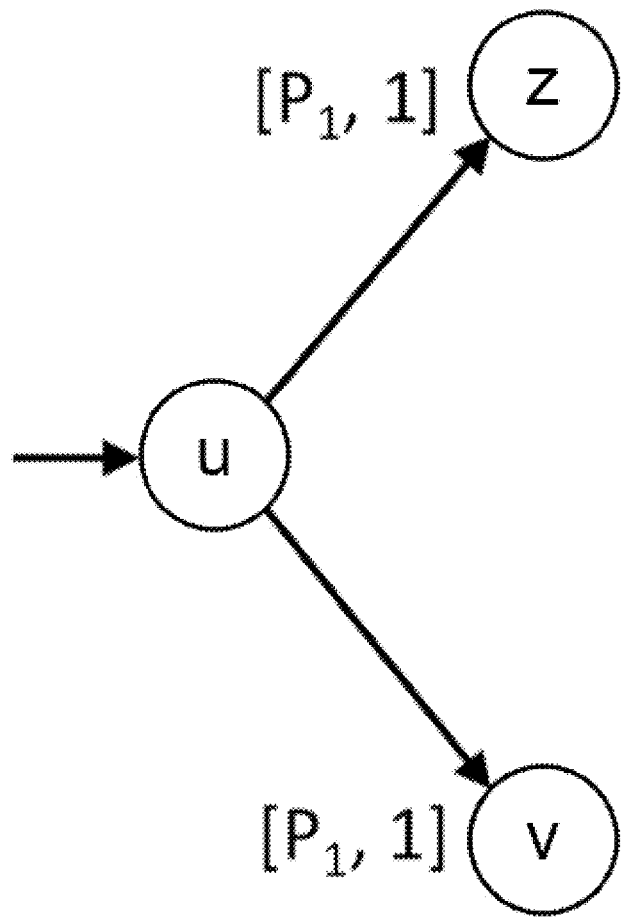
FIGS. 5 (a)-(b) are schematic diagrams of a distance vector (DV) protocol message storage structure according to an implementation of the present disclosure.
Figure 5B:
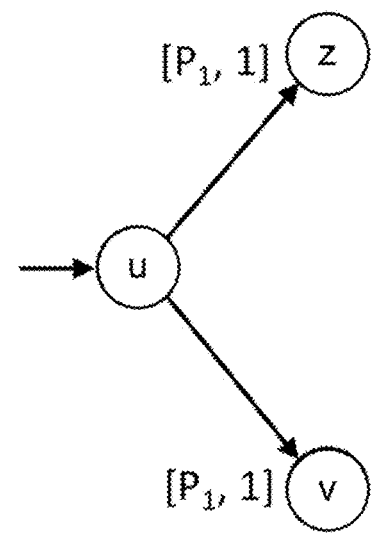

FIG. 5 is a schematic diagram of a distance vector (DV) protocol message storage structure according to an implementation of the present disclosure.

FIG. 5 (a) is an example of a DVNet structure, which includes a directed acyclic network graph composed of nodes v, z and u, and counting results of the LEC table, CIBIn(v), CIBIn(z) and LocCIB(u) at a node u. Specifically, the causality field is ([v, P1, 1], [z, P1, 1]), because a counting value 2 of predicate P1 is computed by means of a result of v and z (that is, 2=1+1).

FIG. 5 (b) shows a DVNet and a node data storage structure in the DVNet, and each device in the network stores two types of information: a local equivalence class table LEC and a counting information base CIB, where the counting information base CIB stores for each node x in the DVNet the number of copies of packets of different packet sets reaching a destination node from a node x in the DVNet. With a device Y given, each LEC corresponds to a group of packets, forwarding actions thereof are the same on Y, and Y stores all LECs thereof in a (packet space packet_space, forwarding action) mapping table called as the LECs table.

The LECs table may be computed and maintained by a plurality of existing data plane verification tools. Specifically, a binary decision diagram (BDD) may be chosen and used to encode a packet set as a predicate (that is, a packet space, and in the present disclosure, a predicate refers to a packet space), and a BDD-based data plane verification tool is used for maintaining a LECs with a minimum number of LECs on the device. This is because the DV protocol requires the device to carry out packet set operation (for example, an intersection set and a union set), which may be efficiently realized by using a logical operation on a BDD.

For each device X, X stores three different types of CIBs:
CIBIn(v), where for each downstream neighbor v of X.node, the X.node stores a latest unprocessed counting result (predicate, counting vector count) received from v in a map;
LocCIB(X.node), which stores different predicates, that is, the number (predicate, counting vector, forwarding action and causality) of copies of the latest packets capable of reaching the destination node from X.node, and tuples, where a causality field records input, so as to obtain a count field; and
CIBOut(X.node), which records a counting result (predicate, counting vector) and a packet space to be retracted of X.node which is about to be sent by X.node to the upstream nodes of X.node.

FIG. 5 (a) shows an example of a DVNet, which includes nodes v and z, and counting results of an LEC table, CIBIn(v), CIBIn(z) and LocCIB(u) at a node u. Specifically, the causality field is ([v, P1, 1], [z, P1, 1]), because a counting value 2 of predicate P1 is computed by means of a result of v and z (that is, 2=1+1).

Figure 6:
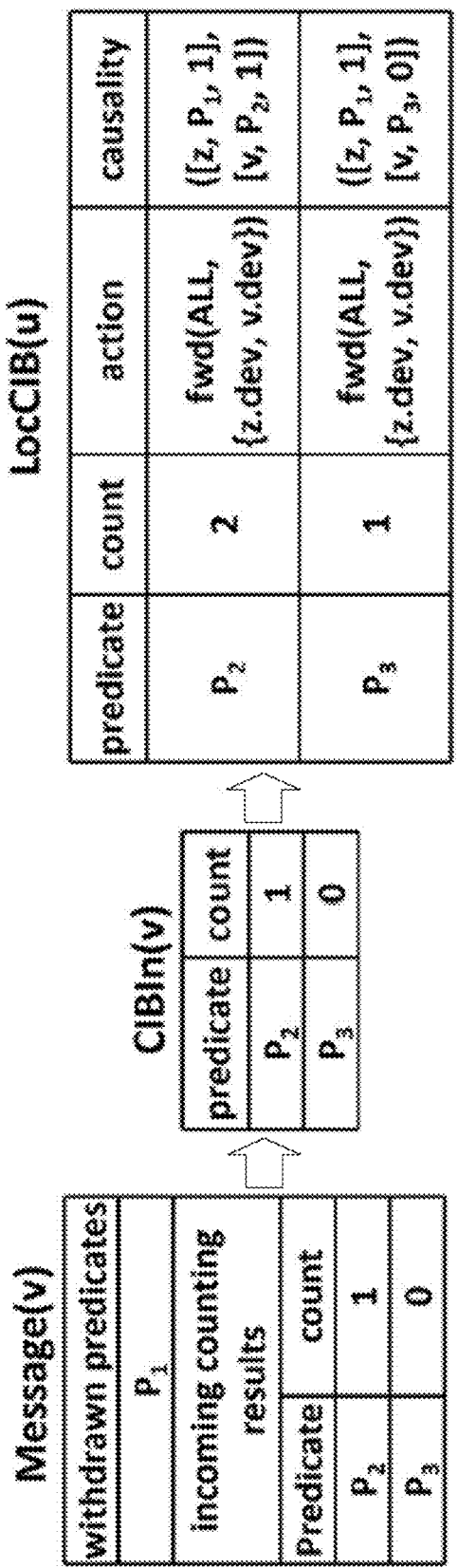
FIG. 6 is a schematic diagram of a DV protocol message processing method.

FIG. 6 is a schematic diagram of a DV protocol message processing method.

Messages in the DV protocol are sent by means of a transmission control protocol (TCP) connection. After being fully received, a message will be processed. The DV protocol defines control messages, such as OPEN and KEEPALIVE, so as to establish and maintain connections between devices. We focus on the update messages, which are used for transmitting the counting results from a certain node to an upstream neighbor node thereof in the DVNet.

With a format of the update message, the update message includes three fields:
an expected link, where an expected link field is a tuple (u, v) which indicates messages, represents that the update messages are transmitted in a direction from a node u in the DVNet to a node v in the DVNet, and is used for computing a result of transmission along the link in the DVNet;
a retraction predicate, where a counting result field represents a to-be-deleted predicate list, and the to-be-deleted predicate list is updated; and
a newly-added counting result, where a newly-added counting result field includes a lately-counted predicate list.

Update message invariant: the DV protocol maintains an important invariant for retracted predicates and a newly-added counting result field, that is, for each update message, a union set of the retraction predicates is equal to a union set of predicates in a newly-added counting result. Therefore, it is ensured that the node always receives a latest complete counting result from a downstream neighbor thereof.

Figures 7A, 7B:
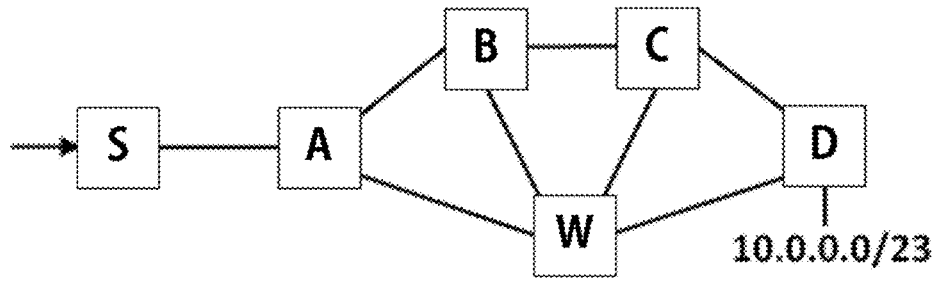
FIGS. 7 (a)-(c) are schematic diagrams of a workflow of a distributed data plane verification method.
Figure 7C:
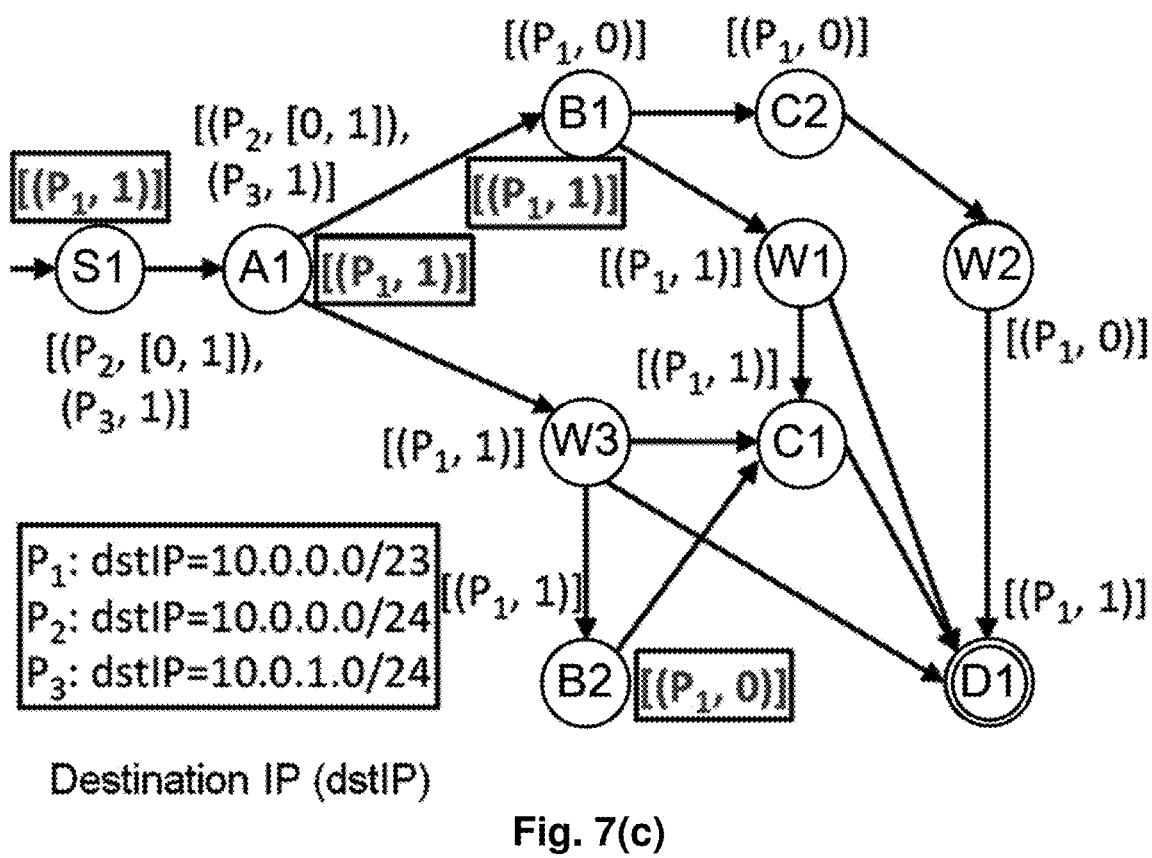
Figure 9A:
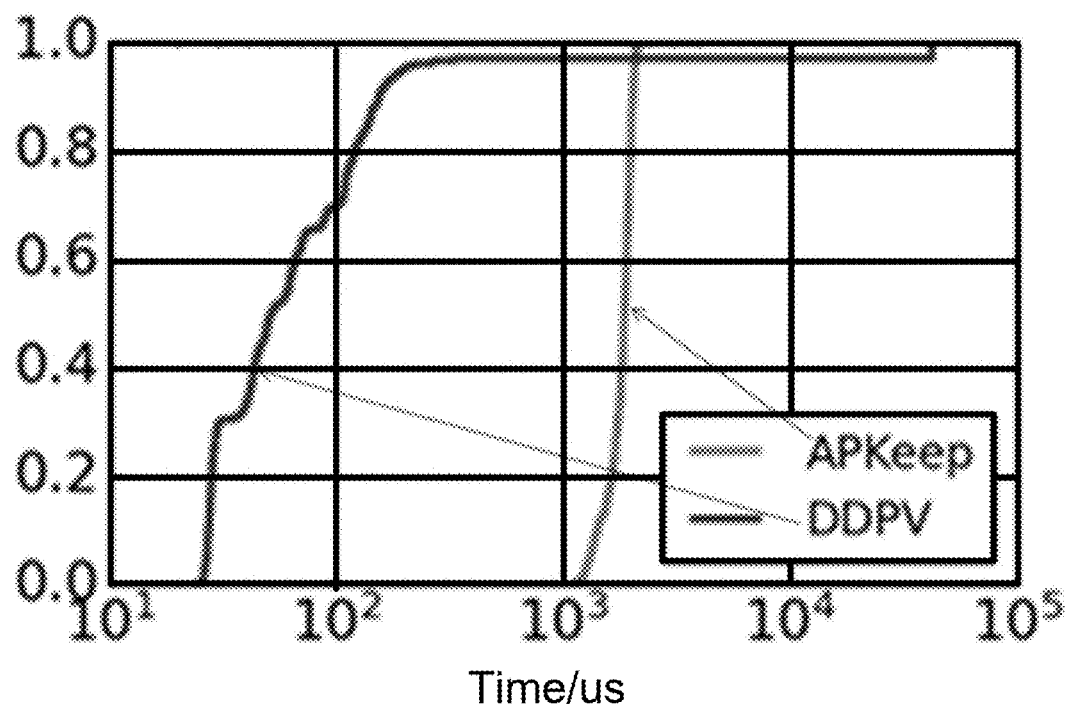
FIGS. 9 (a)-(d) are schematic comparison diagrams of incremental verification time of a distributed data plane verification method according to an implementation of the present disclosure.
Figure 9B:
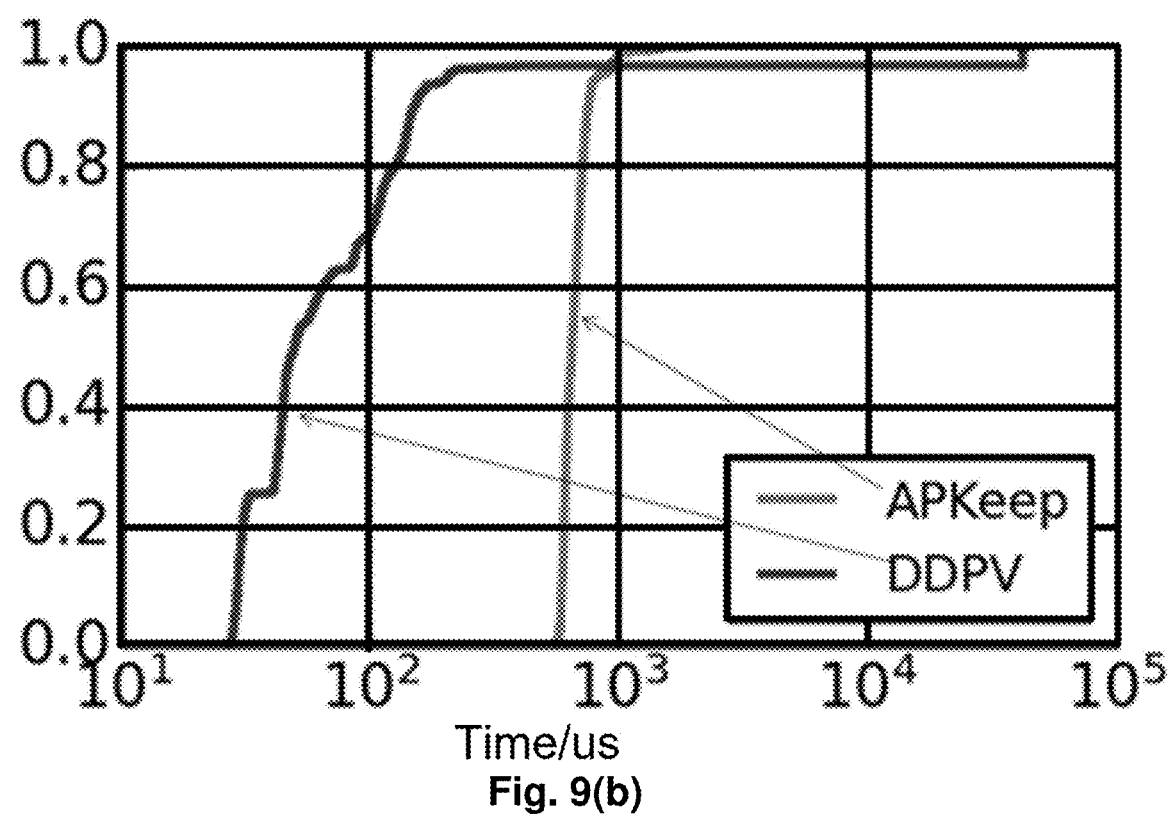
Figure 9C:
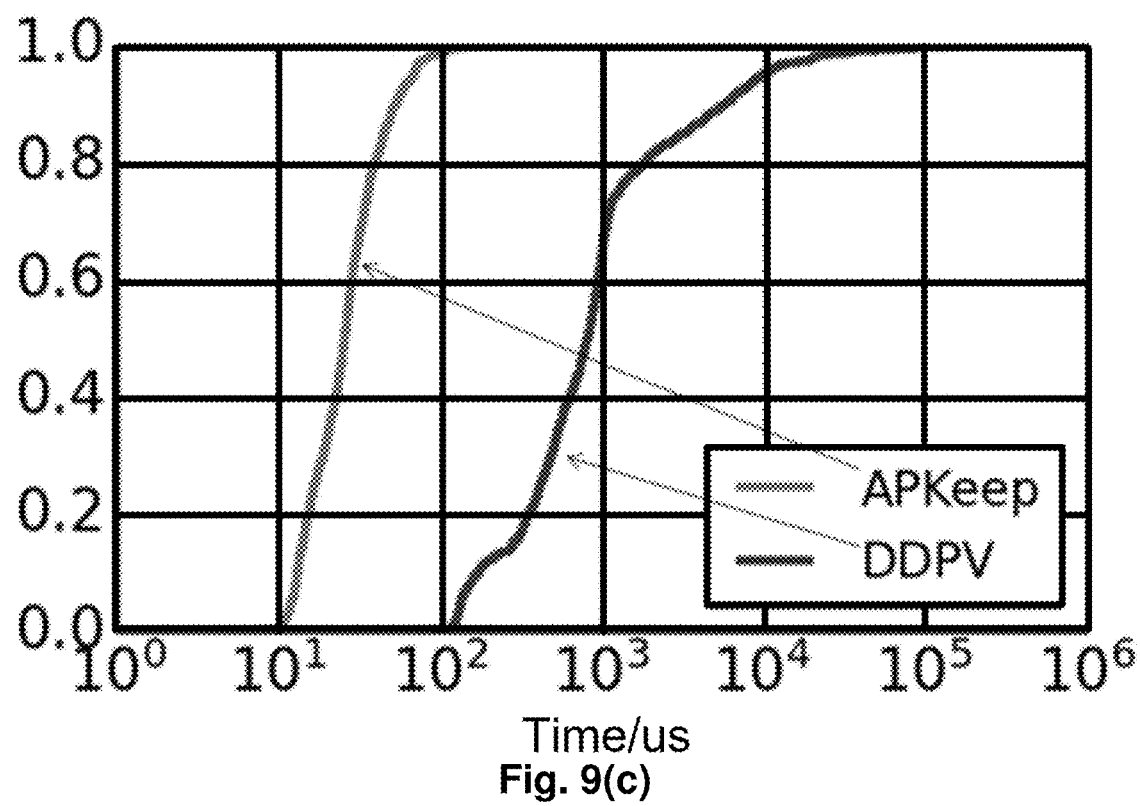
Figure 9D:
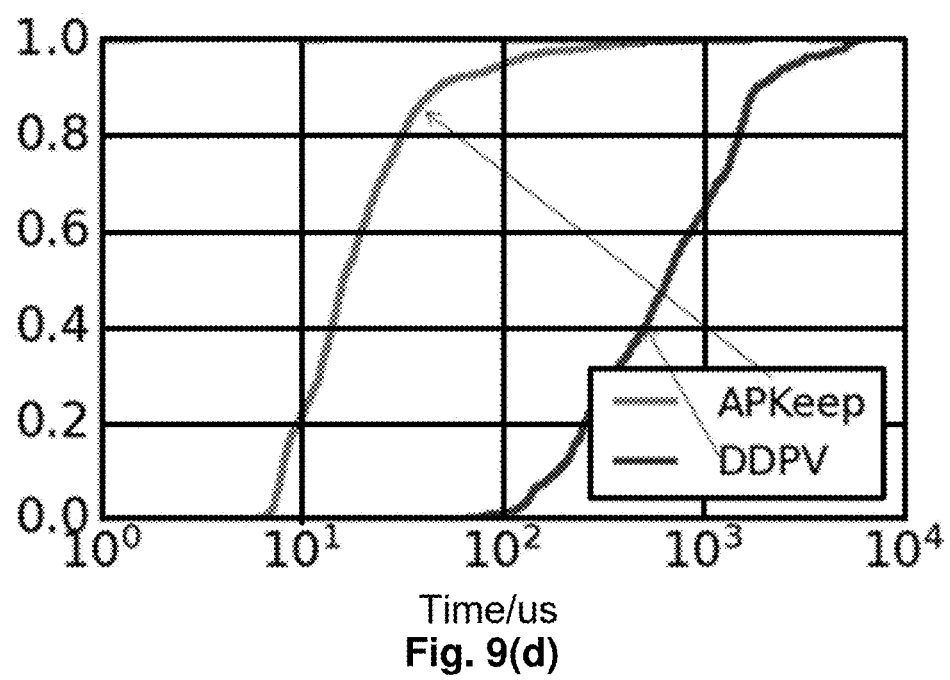

The expected link is used for distinguishing links in the DVNet having the same pair of devices (for example, W1→C1 and W3→C1 in FIG. 7c).

The update message further implies an update message invariant, where the update message invariant has the following meanings that for retracted predicates and newly-added counting result fields, the DV protocol maintains an important invariant, that is, for each update message, a union set of the retracted predicates is equal to a union set of predicates in a newly-added counting result.

The update message invariant ensures that a node always receives a latest complete counting result from a downstream neighbor thereof during message transmission.

Assuming two neighbors u and v in a DVNet, there is a link u→v; and assuming that u.dev receives a specified update message from v.dev, an expected link is u→v. The u.dev processes the message in three steps, and a process for processing update messages is as follows:
step 1, update CIBIn(v). u.dev deletes all entries belonging to to-be-retracted predicates in the CIBIn(v) and inserts all the newly-added counting results into the CIBIn(v), so as to update the CIBIn (v).
step 2, update LocCIB(u), which includes:
firstly update the LocCIB(u), where u.dev finds all the affected entries, that is, to-be-updated entries. Specifically, if a causality field of an entry in LocCIB(u) contains one predicate of retraction predicates belonging to the message in v, the entry needs to be updated.
Then, u.dev updates counting results of all affected entries one by one. Specifically, u.dev computes an intersection set S of a packet space of each pair of affected entry r and entry r0 obtained from the newly received counting result. Under the condition that the intersection set S is not empty, a new entry $r^{new}$ is created for a predicate S in the LocCIB(u). A counting result of $r^{new}$ is computed in two steps: 1) carry out an inverse operation of $\otimes$ or $\oplus$ in causality of $r^{new}$.count and the counting result before v, so as to eliminate an effect of the latter; and 2) carry out $\otimes$ or $\oplus$ between a result of a last step and r0.count, so as to obtain a latest counting result. The forwarding action $r^{new}$.action is the same as r.action. A causality of the entry inherits a causality of r, and a tuple (v, r0.predicate, r0.count) replaces a previous record of v. All new entries are computed and inserted into the LocCIB (u), and then all the affected entries are deleted from the LocCIB (u).

Step 3, update CIBOut(u).

u.dev computes CIBOut(u). Specifically, predicates of all the entries deleted from the LocCIB(u) are put in retracted predicates. All the inserted entries are merged in the CIBOut (u) according to whether the counting values are the same, that is, packet spaces having the same counting value are merged, and the merged result entries are put into the newly-added counting result, so as to replace the entries where the merged packet spaces are located.

After the update message is processed, for each upstream neighbor w of u, u.dev sends an update message composed of the expected link w→u and CIBOut(u).

Data plane updates. If there are to-be-updated data planes of devices (such as insertion/deletion of rules or activation/deactivation of physical ports), DV protocol processes the to-be-updated data planes in a mode of processing the update message. Unlike with regular update messages, in the case, all CIBIn(v) do not need to be updated. A counting result of newly inserted entries in LocCIB(u) is computed by inverting $\otimes$ or $\oplus$ and by reading related entries in different CIBIn (v). In the CIBOut(u), only the newly-added counting entries and the updated lately-counted predicates are taken as the retracted predicates.

Update messages of output inhabitation. A plurality of data planes may be updated in a short period of time during a network event (such as, a scheduled configuration update). Transient data planes do not need to be verified sometimes and computational and communication resources may be wasted. Therefore, DV protocol provides an optional damping mechanism inspired by border gateway protocol. Specifically, after a device u.dev processes the update message and before a new update message is sent, whether there are still unprocessed update messages of update links is checked first. If yes, the unprocessed update messages are continuously processed until a message queue is empty. Latest CIBOut(u) will be sent in a last update message period.

FIG. 7(a)-(c) shows a schematic diagrams of a workflow of a distributed data plane verification method.

As shown in FIG. 7, the workflow of the distributed data plane verification method is as follows:

Firstly, FIG. 7 (a) shows a data plane verification requirement and a network topology: when entering the network from S, all packets reaching 10.0.0.0/23 certainly reach a device D (that is, reachability) having an external port capable of accessing 10.0.0.0/23 via a simple path (that is, loop-freeness) and by means of a device W (that is, a waypoint).

Secondly, from a to-be-verified requirement to the directed acyclic graph DVNet: after this requirement is sent to the verification planner, the verification planner multiplies the regular expression in path_set by the network topology to generate a directed acyclic network graph DVNet, which compactly represents all paths in the network complying with the regular expression (FIG. 7 (c)). It should be noted that destination node in the DVNet is marked with double circles, and nodes in DVNet are not one-to-one mapped to devices in the network. For example, a device C is divided into nodes C1 and C2, because the regular expression allows the packets to reach D via [C, W, D] or [W, C, D].

FIG. 7 (c) shows a distributed counting process. For simplicity, P1, P2, and P3 are used for representing the packet spaces of destination IP prefixes 10.0.0.0/23, 10.0.0.0/24 and 10.0.1.0/24, P2∩P3=empty set and P1=P2∪P3. A node in the DVNet takes results of counting tasks of the data planes of the corresponding devices in the network thereof and all downstream neighbor nodes thereof as input, and mapping is computed (packet space packet_space, counting vector count). The mapping records the different packet spaces, that is, the number of copies of packets in all parallel universes which may be connected from the current node to the destination node in the DVNet.

Each node stores computed mapping thereof in the CIB of the corresponding device thereof and sends the computed mapping to the upstream node of the current node. For example, after computing mapping [P1, 1](that is, a copy of any packet in P1 will be sent to a correct external port), the node D1 sends the result to the devices of upstream neighbors W1, W2, W3, W3 and C1 thereof. Since C1 has only one downstream neighbor D1, C1 checks the data plane of C, computes mapping thereof as [P1, 1], and sends the mapping to the device W of the upstream neighbors W1 and W3. Since this is a reverse counting process, a complete counting result finally received by an ingress device S is taken as the final verification result.

In the example, the data plane in FIG. 7 (b) does not satisfy the verification requirements, and details on the mapping computation for node A1 are provided to illustrate how the DDPV captures this error in a counting process. When A1 receives packets [(P1, 0)] from B1 and W3 receives [(P1, 1)], the data plane of the device A is checked and it is found that for predicate P3. Since A forwards all packets in P3 to W, the number of copies of packets in P3 which may be sent from A to D is one. However, for the packets in predicate P2, A forwards the packets to B or W, but does not forward the packets to both of them. Therefore, in a parallel universe where A forwards packets in P2 to B, the number of copies of packets transmitted to D is zero. In another parallel universe, A forwards packets in P2 to W, and a counting result is 1. Therefore, mapping records about P2 in A1 is (P2, [0, 1]), which indicates that in a parallel universe, packets in P2 may not be transferred via A to D. Since S forwards P1 to A, once S1 receives such information, S may catch the error and alert the operator.

When incremental data plane update is processed, workflow demonstration for DDPV is carried out by considering a scenario, that is, B updates data plane thereof to forward P1 to W instead of C. Modified mapping of the different nodes is circled by the box in FIG. 7 (c). In the case, B1 and B2 will update mapping thereof to [(P1, 1)] and [(P1, 0)] respectively, and send update to upstream neighbors thereof. However, since W does not forward any packets to B, an upstream neighbor W3 of B2 does not need to update mapping thereof. By contrast, an upstream neighbor A1 of B1 will update mapping thereof to [(P1, 1)], because whether A forwards packets in P2 to B or W, one copy of each packet will be sent to D, and P2∪P3=P1. Similarly, S1 further updates mapping thereof to [(P1, 1)], that is, update is carried out to satisfy the requirements.

Figure 10A:
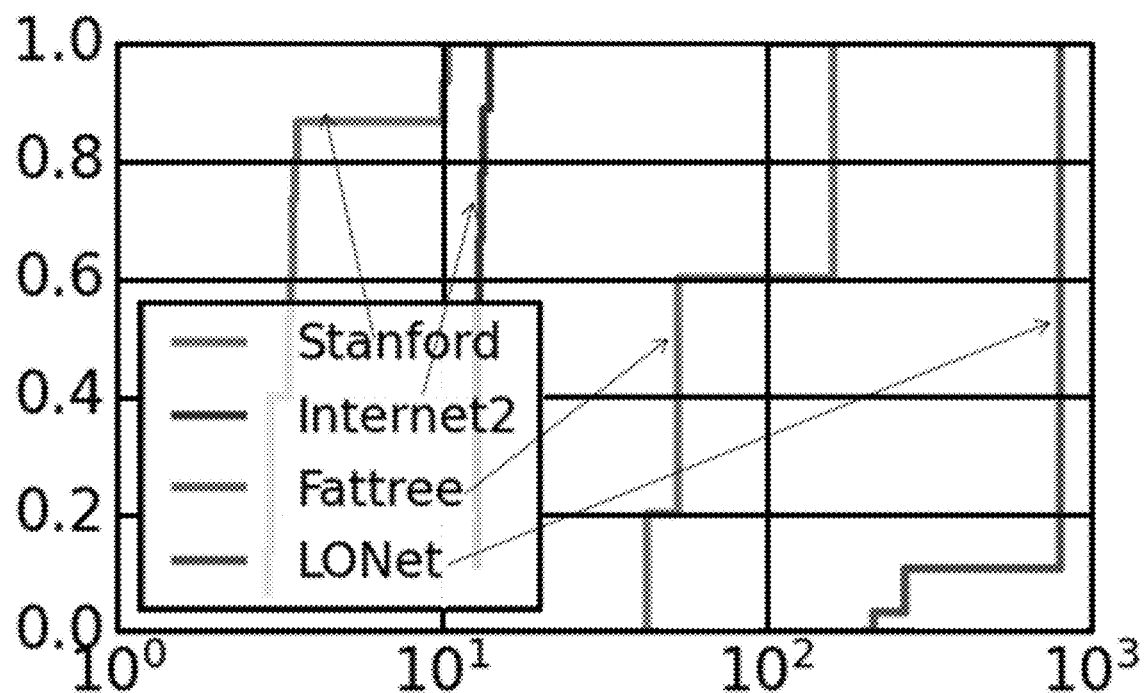
FIG. 10 (a) is a schematic comparison diagram of memory overhead of a distributed data verification method according to an implementation of the present disclosure.
Figure 10B:
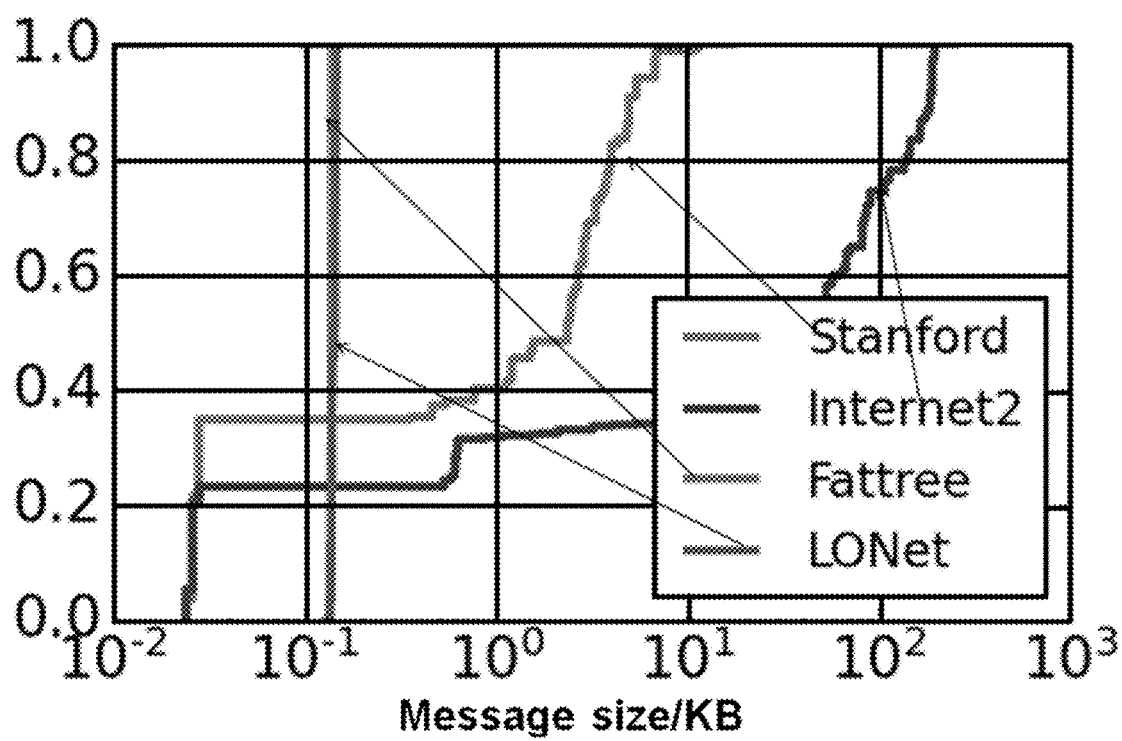

FIG. 8 to FIG. 10 are experimental results based on the distributed data plane verification method and system of the present disclosure, and the scenarios, data, tools, test indexes, etc. related to the experiments are as follows:

1. Experimental scenarios and experimental data sets. We first evaluate the performance of DDPV in scenarios where large-scale data plane updates occur in a short period of time, such as, a green start of a data center and an update of a large area network. In order to fully test scalability of DDPV, we considered green starts of four topologies, and the corresponding data sets of the four topologies are shown in Table 1. Specifically, LONet is a real and large data center network, which uses a border gateway protocol (BGP) as a routing protocol thereof. We collect forwarding rules thereof by simulating the network and policies thereof. A data set generation method for Fattree is similar to that for LONet. Data sets of Internet 2 and Stanford are public.
2. Performance comparison method. In the case of the same scenario and data set, for fair comparison, we compare the performance of DDPV with that of a fastest centralized DPV tool APKeep. The performance tests include loop-freeness, no black hole and arbitrary reachability, which are common DPV requirements. Since a source code of APKeep is not public, we implement the code on the basis of a pseudocode of APKeep.
3. Comparative indicators. We compared the verification time of DDPV and APKeep systems, so as to demonstrate the advantages of DDPV in realizing scalability of DPV. The verification time is the time required from updating data plane on the devices to verifying all requirements in the network, which does not include network transmission and propagation delay. We think this is fair because despite DDPV needs to transfer counting results between devices, a centralized DPV tool also needs to collect data planes from devices with data plane changes. In order to demonstrate that DDPV may be deployed on large commercial network devices, we measured memories of the verifiers on the devices and sizes of DV update messages at the end of a burst update experiment.

FIG. 8 is a schematic comparison diagram of a green start experiment effect of a data plane verification method according to an implementation of the present disclosure.

As shown in FIG. 8, from Table 2, we observed that a verification speed of DDPV is 2758 times that of APKeep in a green start experiment of the data center. Even for relatively small networks, such as internet 2 and stanford, a verification speed of DDPV is at least five times that of APKeep. This is because DDPV decomposes a verification requirement into smaller tasks on devices, dependency chains of theses tasks are roughly linear with the diameter of the network. The diameter of the data center is extremely small (such as, 5 hops). As a result, the verifiers of the devices achieve an extremely high level of parallelism, making DDPV highly scalable.

FIG. 9 is a schematic comparison diagram of incremental verification time of a distributed data plane verification method according to an implementation of the present disclosure.

As shown in FIG. 9, we will evaluate the incremental verification performance of DDPV. For each topology we tested, we take the data planes after burst update experiments as starting points to randomly generate one thousand of data plane rule updates evenly distributed on the devices, and apply the updates one by one. After each update, we will gradually verify the network data planes.

From FIGS. 9 (a) and 9 (b), we observe that for LONet of FIG. 9 (a) and Fattree of FIG. 9 (b), the 90% incremental verification speeds of DDPV are thirteen times and 5 times that of APKeep respectively. This is because when a data plane update occurs at DDPV, only devices whose counting results are likely to change need to update the results gradually, and only those changed results are gradually sent to the neighbors of the devices. In a data center topology having a large number of connections, most data plane updates do not change the counting results of the devices where the data plane updates are located. Therefore, DV update messages do not need to be sent, so as to reduce incremental verification time. By contrast, from FIG. 9 (c) and FIG. 9 (d), we observe that in Internet 2 of FIG. 9 (c) and Stanford network of FIG. 9 (d), the incremental verification speeds of DDPV are slightly less than that of APKeep. There are two reasons for this. Firstly, they are too small to reveal the performance bottleneck of centralized data plane verification. Secondly, in networks having relatively few connections, data plane updates have a greater possibility to change the counting results of a plurality of devices, which needs to send update messages between devices, and we determined by setting program breakpoints that this is the root cause of the extended incremental verification time. By means of experiments, it is found that the bottleneck of the update message is serialization and deserialization of BDD. The bottleneck may be improved by using a BDD base having efficient communication or representation of the packet spaces.

The following shows the memory of the verifier on the measurement device at the end of the burst update experiment, and the size of the DV update message.

FIG. 10 (a) is a schematic comparison diagram of memory overhead of a distributed data verification method according to an implementation of the present disclosure.

Size of memory FIG. 10 (a) shows a cumulative distribution function (CDF) of a memory of a verifier on a device across devices. We observes that for Internet2, Stanford, and Fattree, DDPV occupies less than 100 MB of memory on most devices, and even for LONet, that is, the largest data center network, DDPV occupies only 807 MB of memory on devices, which lots of commercial switches may afford.

FIG. 10 (b) is a schematic comparison diagram of bandwidth overhead of a distributed data verification method according to an implementation of the present disclosure.

FIG. 10 (b) shows a size of an update message on the basis of a DV. FIG. 10 (b) shows the CDF a size of all update messages in each experiment, and it may be observed that all the update messages are less than 196 KB, indicating that a bandwidth overhead of DDPV is extremely low. Particularly, update messages of LONet and Fatree generally have 138 bytes. This is because in these experiments, we disabled the suppression option of the DV protocol such that CIBOut is sent for each incoming update message.

From the comparison results of FIGS. 10 (a) and 10 (b), the following conclusions may be drawn: DDPV generates little storage and communication overhead on the device, such that it is feasible to deploy DDPV on commercial network devices.

Figure 11A:
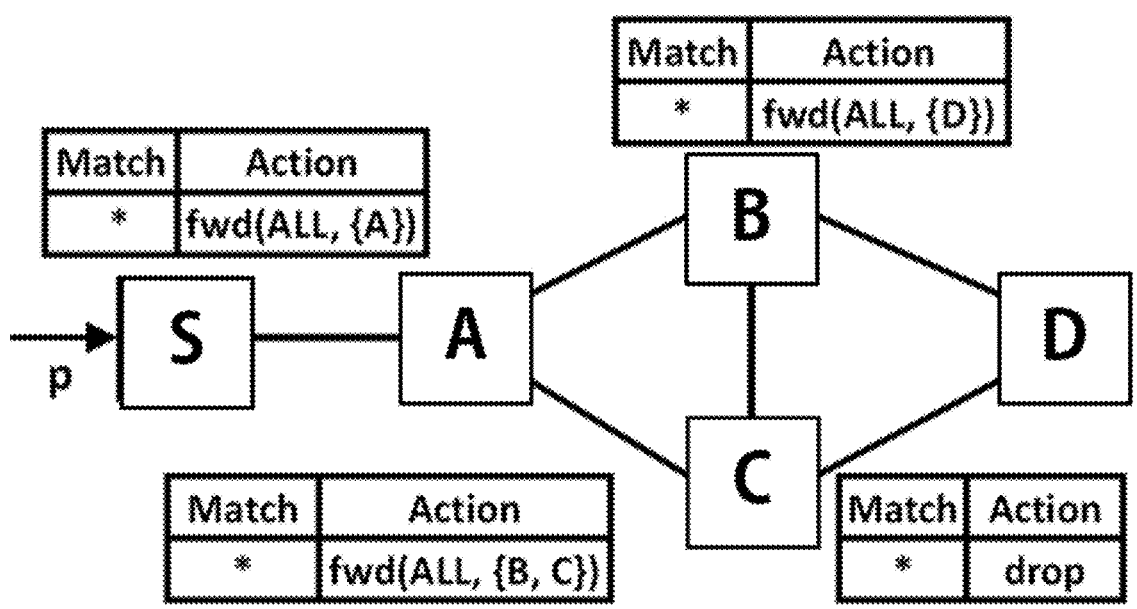
FIGS. 11 (a)-(c) are a schematic diagram for explaining a concept of a parallel universe as provided in the present disclosure.
Figure 11B:
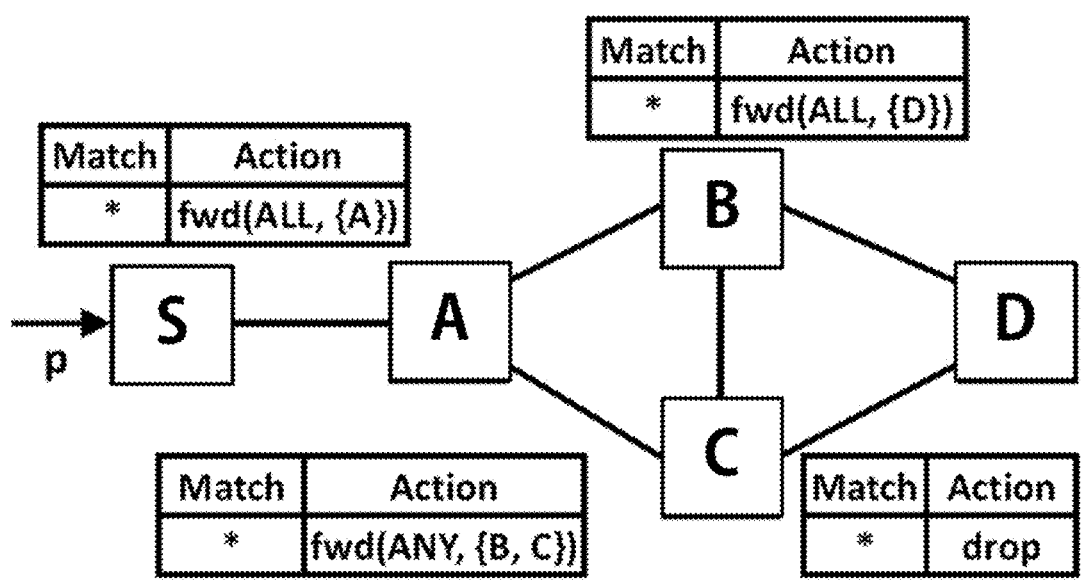
Figure 11C:
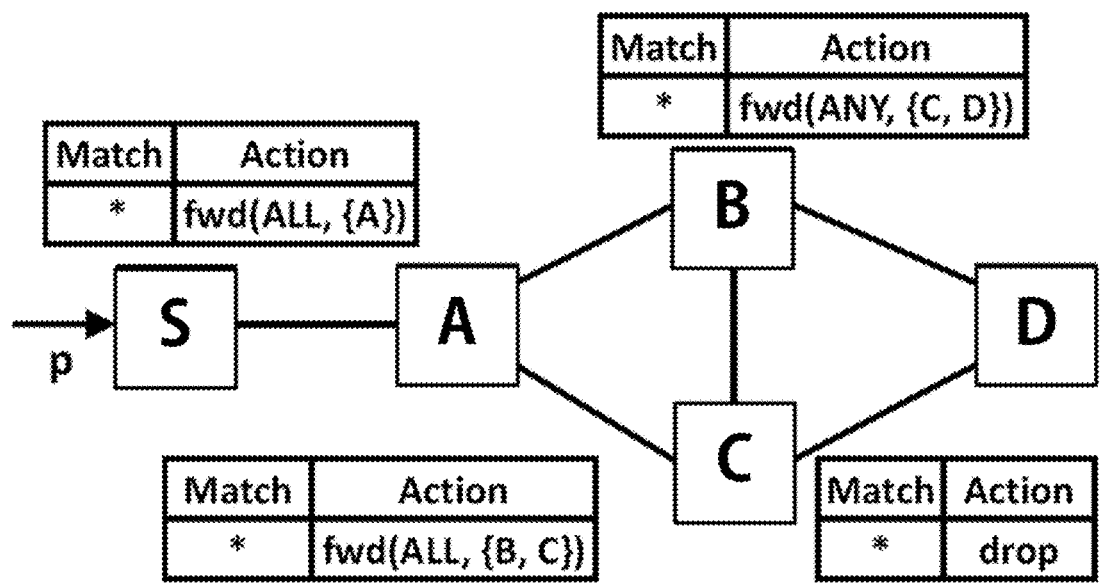

FIG. 11 is a schematic diagram for explaining a concept of a parallel universe as provided in the present disclosure.

FIG. 11 below illustrates the concept of a parallel universe, and the parallel universe may be translated into a coexistence path set. In FIG. 11, the packet path is used for recording devices involved in the process that a packet is transmitted between devices until the packet is discarded or sent to the destination device. S is taken as a start point of a path, D is taken as an end point of the path, that is, the destination device, and the device which discards all packets will also be the end point of the path.

The packet p in FIG. 11 (a) has two packet paths, that is, (S, A, B, D) and (S, A, C), which belong to a parallel universe, because A forwards p to both B and C so as to eventually reach the end point of the path, that is, the two packet paths may coexist. All packet paths of packet p constitute a coexistence path set thereof.

P in FIG. 11 (b) has two packet paths, that is, (S, A, B, D) and (S, A, C), which belong to two parallel universes, because A only forwards p to either B or C. That is to say, in order to reach the end point of the path in the case, the packet p may select only one of the above packet paths to pass through. Then the two packet paths may not coexist and therefore belong to two parallel universes. Therefore, for the packet p in the case, there are two coexistence path sets. It should be noted that for one packet, different parallel universes which exist in the packet have a mutually exclusive relation.

P in FIG. 11 (c) has three packet paths and only two parallel universes, where {[S, A, B, C], [S, A, C]} belongs to one parallel universe and {[S, A, B, D], [S, A, C]} belongs to the other parallel universe.

In FIGS. 11 (a), (b) and (c), "forwarding (all, {B,C})" means that the current device will forward the data packets to both B and C after receiving the data packets, and "forwarding (any one, {B,C})" means that the current device will only forward the data packets to B or C after receiving the data packets, that is, only one of B and C, rather than all. Other similar understandings "discard" means that the packet is not forwarded to any other device after it is received. Particularly, for a packet, different parallel universes which exist in the packet have a mutually exclusive relation.

The distributed data plane verification method provided by the present disclosure does not continue to compress a performance improvement space of centralized data plane verification, but uses a distributed design to avoid inherent scalability bottleneck of a centralized design. Azure RCDC divides the data plane by means of devices, but stops at only verifying the availability of all shortest paths with higher-level parallelism in a cluster. By contrast, we go beyond that, and for a wide range of requirements (such as reachability, waypoints, multicast and anycast), by means of distributed verification tasks on devices and limited communication between devices, we may verify them in a combined manner, so as to realize scalable data plane check in a common setting.

The distributed data plane verification method provided in the present disclosure systematically solves the important problem of how to scale up data plane verification, so as to be suitable for actual large-scale networks. A scalable data plane verification tool may quickly discover network errors in large networks, may further support new services such as fast rollbacks and switching between a plurality of data planes, and data plane verification across administrative domains.

The distributed data plane verification system provided in the present disclosure may further be implemented by a device employing a hardware implementation manner of a processing system.

The device may include corresponding modules that perform each or several steps in the above method. Therefore, each step or several steps in the above method can be performed by the corresponding modules, and the device can include one or more of these modules. The module may be one or more hardware modules specially configured to perform the corresponding steps, or implemented by a processor configured to perform the corresponding steps, or stored in a computer-readable medium for implementation by a processor, or implemented by some combination.

The hardware structure can be realized by bus architecture. The bus architecture can include any number of interconnect buses, depending on the specific application of the hardware and overall design constraints. The bus connects various circuits including one or more processors, memory, and/or hardware modules together. The bus may also connect various other circuits such as peripherals, voltage regulators, power management circuits, external antennas, and the like.

The bus may be an ISA (Industry Standard Architecture) bus, a PCI (peripheral component) bus, or an EISA (extended industry standard component) bus. Bus can be divided into address bus, data bus, control bus, etc. For ease of representation, only one connecting line is used in the figure, but it does not mean that there is only one bus or one type of bus.

Any process or method description in the flowchart or otherwise described herein may be understood to represent a module, fragment or part of code including one or more executable instructions for implementing the steps of a particular logical function or process, and the scope of the preferred embodiment of the present disclosure includes additional implementations, which may not be in the order shown or discussed, It includes performing functions in a basically simultaneous manner or in a reverse order according to the functions involved, which should be understood by those skilled in the art to which the embodiments of the present disclosure belong. The processor performs the various methods and processes described above. For example, the method embodiments in the present disclosure may be implemented as a software program that is tangibly contained in a machine-readable medium, such as a memory. In some embodiments, some or all of the software programs may be loaded and/or installed via memory and/or communication interfaces.

When the software program is loaded into memory and executed by the processor, one or more steps of the method described above may be performed. Alternatively, in other embodiments, the processor may be configured to perform one of the above methods by any other suitable means (by means of firmware).

The logic and/or steps represented in the flowchart or otherwise described herein may be embodied in any readable storage medium for use by, or in combination with, instruction execution systems, devices or devices, such as computer-based systems, systems including processors, or other systems that can take instructions from and execute instructions.

For the purpose of this specification, "readable storage medium" may be any device that can contain, store, communicate, propagate or transmit programs for or in combination with instruction execution systems, devices or devices. More specific examples of readable storage media include the following: electrical connection unit (electronic device) with one or more wiring, portable computer disk box (magnetic device), random access memory (RAM), read only memory (ROM), erasable and editable read only memory (EPROM or flash memory), optical fiber device, and portable read only memory (CDROM). In addition, the readable storage medium may even be paper or other suitable medium on which the program can be printed, because the program can be obtained electronically, for example, by optical scanning of the paper or other medium, followed by editing, interpretation or other suitable processing if necessary, and then stored in the memory.

It should be understood that parts of the present disclosure may be implemented in hardware, software, or a combination thereof. In the above embodiment, the plurality of steps or methods can be implemented by software stored in memory and executed by a suitable instruction execution system. For example, if implemented in hardware, as in another embodiment, it can be implemented by any of the following technologies known in the art or their combination: discrete logic circuit with logic gate circuit for realizing logic function of data signal, application specific integrated circuit with appropriate combined logic gate circuit, programmable gate array (PGA), field programmable gate array (FPGA), etc.

Those skilled in the art can understand that all or part of the steps of realizing the method of the above embodiment can be completed by instructing relevant hardware through a program, and the program can be stored in a readable storage medium. When the program is executed, it includes one or a combination of the steps of the method implementation.

In addition, the functional units in various embodiments of the present disclosure can be integrated in one processing module, each unit can exist separately, or two or more units can be integrated in one module. The above integrated modules can be realized in the form of hardware or software function modules. If the integrated module is implemented in the form of software function module and sold or used as an independent product, it can also be stored in a readable storage medium. The storage medium can be read only memory, magnetic disk or optical disc.

In the description of this specification, the description referring to the terms "one embodiment/example", "some embodiments/examples", "examples", "specific examples", or "some examples" means that the specific features, structures, materials or features described in combination with the embodiments/modes or examples are included in at least one embodiment/mode or example of this application. In this specification, the schematic expression of the above terms does not have to be the same embodiment/mode or example. Further, the specific features, structures, materials or features described may be combined in any one or more embodiments/modes or examples in a suitable manner. In addition, without contradiction, those skilled in the art can combine and combine the different embodiments/modes or examples described in this specification and the features of different embodiments/modes or examples.

Those skilled in the art should be understood that the above implementations are merely clearly illustrative of the present disclosure, but are not intended to limit the scope of the present disclosure. For a person skill in the pertained field, other changes or modifications may be made on the basis of the above disclosure, and these changes or modifications still fall within the scope of the present disclosure.

What is claimed is:

1. A distributed data plane verification method, executed by a processor, comprising:
   receiving a data plane verification requirement, a network topology and device-internet protocol (IP) prefix mapping information by a verification planner;
   generating a directed acyclic network graph DVNet by the verification planner on the basis of the data plane verification requirement and the network topology, wherein generating the directed acyclic network graph DVNet on the basis of the data plane verification requirement and the network topology comprises:
   converting the data plane verification requirement expressed in a regular expression into a finite automaton;
   multiplying the finite automaton by the network topology to obtain a product graph G0=(V0, E0), wherein V0 represents a node set in the product graph G0, and E0 represents an edge set having a directed connection relation in the product graph G0;
   carrying out state minimization on the product graph G0, so as to remove redundant nodes to obtain the directed acyclic network graph DVNet;
   decomposing a counting task by the verification planner, so as to enable al-devices in a network to obtain decomposed counting tasks,
   receiving the decomposed counting tasks by the devices in the network, and counting by verifiers on the devices, so as to obtain a verification result of data planes, wherein receiving the decomposed counting tasks by the devices in the network, and executing the counting tasks by verifiers on the devices comprise:
   executing the counting tasks by the verifiers on the devices on the basis of a distance vector (DV) protocol, the executing the counting tasks comprising:
   initializing the verifiers on the devices;
   transmitting update messages to DVNet nodes having adjacency relations one by one by the devices along a reverse path of a DVNet;
   counting by the devices receiving the update messages on the basis of the update messages; and
   taking a complete counting result finally received by an ingress device of the devices as the verification result;
   wherein the DV protocol comprises regulating message transmission and counting result sharing between the verifiers on the devices and neighbor devices.

2. The distributed data plane verification method according to claim 1, wherein the data plane verification requirement comprises:
   packet spaces representing all packet sets participating in verification;
   an ingress set representing a start port set on a verification path;
   a path set representing a network device set on a transmission path via which a verification requirement is satisfied; and
   a requirement context representing constraints for satisfying the data plane verification requirement by means of more preset rules, and specifically, for satisfying at least one of reachability, loop-freeness, no-redundant-delivery routing or path and trajectory integrity verification,
   wherein the packet spaces can be defined by different network architectures and comprise at least one of packet spaces defined by a transmission control protocol/internet protocol (TCP/IP) five-tuple, a TCP/IP five-layer model, an open system interconnect (OSI) seven-layer model and a programmable switch.

3. The distributed data plane verification method according to claim 1, wherein the data plane verification requirement is standardly expressed by means of a declarative language.

4. The distributed data plane verification method according to claim 1, wherein the data plane verification requirement is a composite requirement composed of a plurality of data plane verification requirements.

5. The distributed data plane verification method according to claim 1, wherein mapping relations between the nodes in the DVNet and the devices includes a one-to-one relation and a many-to-one relation, the many-to-one mapping relation represents that to-be-transmitted packets reach the same destination node via different paths, and under the condition that the different paths include the same device, the same device has different identifiers in the different paths.

6. The distributed data plane verification method according to claim 1, wherein initializing the verifiers on the devices comprises:
reading data planes of the devices by all the verifiers, wherein the data planes construct a local equivalence class table, and the local equivalence class table contains information of the packet space and an action;
computing the number of copies of packets, from a current node to a destination node in the DVNet, in different packet spaces by all the verifiers, and storing the number in an information counting base; and
incrementally sending computation results to the verifiers of the adjacent devices by all the verifiers, wherein
the packet space represents a to-be-processed packet set from a current node to a destination node in the DVNet,
the action is a forwarding action for the packets, and includes ALL type and ANY type, the ALL type and ANY type include at least one of anycast forwarding between a plurality of next hops by the network devices, multicast forwarding between a plurality of next hops by the network devices, and forwarding actions defined in an OpenFlow® standard and a P4® (programming protocol-independent packet processors) standard,
the counting information base includes:
CIBIn(v), representing a counting information base of a downstream node v of a current node in the DVNet, and being used for storing packet spaces and counting results of the downstream node v;
LocCIB(u), representing a local counting information base of a current node u in the DVNet, and being used for storing packet spaces, counting results, actions and causalities of the current node u in the DVNet; and
CIBOut(u), representing a counting information base of node u which is about to be sent by the current node u to the upstream nodes of the node u in the DVNet, and being used for storing new packet spaces and counting results generated after the current node u in the DVNet receives the update message and to-be-retracted packet spaces.

7. The distributed data plane verification method according to claim 1, wherein the update message comprises information of
an expected link, wherein an expected link field is a tuple (u, v) which indicates messages, represents that the update messages are transmitted in a direction from node u in the DVNet to node v in the DVNet, and is used for computing a result of transmission along the link in the DVNet;
a retraction packet space, wherein a retraction packet space field represents a to-be-deleted packet space list, and a counting value of to-be-deleted packet spaces is updated; and
a newly-added counting result, wherein a newly-added counting result field represents a lately-counted packet space list.

8. The distributed data plane verification method according to claim 7, wherein the update message further includes an update message invariant, the update message invariant means that for each update message, a union set of the retraction packet spaces is equal to a union set of the packet spaces in the newly-added counting result, and the update message invariant ensures that each node in the DVNet always receives a latest complete counting result from a downstream neighbor node thereof.

9. The distributed data plane verification method according to claim 7, wherein counting by the device receiving the update message on the basis of the update message, includes updating CIBIn(v); updating LocCIB(u) and updating CIBOut(u),
wherein the step of updating CIBIn(v) includes: deleting all entries belonging to the to-be-retracted packet space in the CIBIn(v) and inserting all the newly-added counting results into the CIBIn(v) by the u.dev, so as to update the CIBIn (v);
wherein the step of updating LocCIB(u) includes:
finding all to-be-updated entries by the u.dev, where a method for determining to-be-updated entries includes: under the condition that a causality field of an entry in the LocCIB(u) contains a packet space in v belonging to the retraction packet space of the message, updating the entry;
updating counting results of all the to-be-updated entries one by one, which includes:
computing, by the u.dev, an intersection set S of a packet space of each pair of to-be-updated entry r and entry r0 obtained from the newly received counting result;
creating a new entry $r^{new}$ for the packet space S in the LocCIB(u) under the condition that the intersection set S is not empty, where a method for computing a counting result of the $r^{new}$ includes:
carrying out an inverse operation of $\otimes$ or $\oplus$ in causality of $r^{new}$.count and the counting result before the node v in the DVNet, so as to eliminate an effect of carrying out $\otimes$ or $\oplus$ between a result of a last step and r0.count, so as to obtain a latest counting result, where $\otimes$ represents a counting vector first operation and $\oplus$ represents a counting vector second operation;
carrying out $\otimes$ or $\oplus$ between the result of the last step and r0.count, so as to obtain the latest counting result, where
a forwarding action of a $r^{new}$ is the same as that of the to-be-update entry r,
causality of the $r^{new}$ inherits causality of r, and a tuple (v, r0.predicate, r0.count) replaces a previous record of v;
computing and inserting all new entries into the LocCIB (u) to finish update, and deleting all the to-be-updated entries from the LocCIB(u);
the step of updating CIBOut(u) includes:
putting the packet spaces of all the entries deleted from the LocCIB(u) in the retraction packet space;
merging all the inserted entries in the CIBOut(u) according to whether the counting values are the same, carrying out merging under the condition that the counting values are the same, and putting the merged entries into the newly-added counting result, so as to replace the entries where the merged packet spaces are located;
wherein, meanings of all expressions are as follows:
.predicate represents a packet space of to-be-forwarded packets at a certain port of the device,
.count represents the counting value,
u represents a current node identifier in the DVNet,
v represents an upstream node identifier of the current node in the DVNet,
.dev represents a device identifier of the current node in DVNet, CIBIn(v) represents a counting information base of a downstream node v of a current node in the DVNet, and is used for storing a packet space and a counting value of the downstream node v, LocCIB(u) represents a counting information base of a local node of a current node u in the DVNet, and is used for storing a packet space, a counting value, an action and causality of the current node u in the DVNet, and CIBOut(u) represents a counting information base of node u which is about to be sent by the current node u to the upstream nodes of the node u in the DVNet, and is used for storing new packet spaces and counting results generated after the current node u in the DVNet receives the update message and to-be-retracted packet spaces.

10. The distributed data plane verification method according to claim 9, further comprising: under the condition that there are to-be-updated data planes of devices, updating the data planes by processing the update messages on the basis of the DV protocol, the updating the data planes comprising:

newly inserting entries in LocCIB(u), wherein the counting results of the entries are computed by means of a first counting vector operation or a second counting vector operation and by reading related entries in different CIBIn (v), and the related entries represent entries existing in causalities of the newly inserted entries in the CIBIn(v);

taking only newly-added counting entries and the updated lately-counted packet spaces as the retraction packet spaces in CIBOut(u); and wherein data plane update comprises insertion/deletion of rules or activation/deactivation of physical ports.

11. The distributed data plane verification method according to claim 9, executed by the processor, further comprising:

checking, after a current device processes the update message and before a new update message is sent, whether there are still unprocessed update messages of update links;

continuing, under the condition that unprocessed update messages of update links are detected, to process the update messages by the current device until all the update messages are processed;

sending latest CIBOut(u) of a current node in a last update message period;

giving a requirement with a counting result value in a context on the basis of counting monotonicity of the DVNet, wherein when the current node u finishes computing cu, under the condition that the counting result value is greater than or equal to N or the counting result value is less than or equal to N, the current node u only needs to send a minimum element or a maximum element in $c^u$ to an upstream neighbor node in the DVNet;

under the condition that the counting result value is equal to N, in the case that $c^u$ has only one element, the only element is sent to the upstream node of the current node u;

in the case that $c^u$ has two or more elements, two minimum elements in the $c^u$ are sent to the upstream node of the current node u; wherein for a requirement having context equivalence, minimum counting information of the current node u is an empty set, such that distributed verification becomes local verification;

preferentially, the node u even does not need to compute cu, the node u checks whether a device with an identifier of u.dev forwards any packet specified in the requirement to all devices of downstream neighbors of u in the DVNet, if not, it is indicated that a current network state violates the requirement to be verified, and the device with an identifier of u.dev generates exception prompt information;

meanings of all expressions are as follows:

CIBOut(u) represents a counting information base of node u which is about to be sent by the current node u to the upstream nodes of node u in the DVNet, and is used for storing new packet spaces and counting results generated after the current node u in the DVNet receives the update message and to-be-retracted packet spaces;

$c^u$ represents a counting vector result of the current node u;

the counting monotonicity of the DVNet has the following meaning: assuming that two vectors c1 and c2 have only nonnegative elements, under the condition that any element $x \in c1$ and $y \in c2$ and a corresponding element $z=y+z \otimes c1(c2$, it is certain that $z \geq y$ and $z \geq z$, and under the condition that any element $x \in c1$ and a corresponding element $z=x \in c1 \oplus c2$, it is certain that $z \geq x$; and u.dev represents a device identifier of the current node in the DVNet.

12. A distributed data plane verification system, comprising:

a verification planner receiving a data plane verification requirement, a network topology and a device-IP prefix mapping information, generating a directed acyclic network graph DVNet on the basis of the data plane verification requirement and the network topology, and decomposing a counting task, so as to enable all devices in a network to obtain decomposed counting tasks, wherein the generating a directed acyclic network graph DVNet on the basis of the data plane verification requirement and the network topology comprises:

converting the data plane verification requirement expressed in a regular expression into a finite automaton;

multiplying the finite automaton by the network topology to obtain a product graph G0=(V0, E0), wherein V0 represents a node set in the product graph G0, and E0 represents an edge set having a directed connection relation in the product graph G0;

carrying out state minimization on a product graph, so as to remove redundant nodes to obtain the directed acyclic network graph DVNet;

a plurality of verifiers distributed on the devices in the network, configured to receive the decomposed counting tasks and execute the counting tasks, and obtaining a data plane verification result by means of a counting result, wherein the counting result is a complete counting result finally received by an ingress device of the devices, wherein to receive the decomposed counting tasks by the devices in the network, and execute the counting tasks by verifiers on the devices comprise:

executing the counting tasks by the verifiers on the devices on the basis of a distance vector (DV) protocol, the executing the counting tasks comprising:

initializing the verifiers on the devices;
transmitting update messages to the DVNet nodes having adjacency relations one by one by the devices along a reverse path of the DVNet;
counting by the devices receiving the update messages on the basis of the update messages;
taking a complete counting result finally received by an ingress device of the devices as the verification result; wherein the DV protocol refers to a method for regulating message transmission and counting result sharing between the verifiers on the devices and neighbor devices.

* * * * *